United States Patent
Hirata et al.

(10) Patent No.: US 9,288,367 B2
(45) Date of Patent: Mar. 15, 2016

(54) GLOSSINESS DETERMINING DEVICE, COLOR MEASURING DEVICE, IMAGE FORMING APPARATUS, AND GLOSSINESS DETERMINATION METHOD

(71) Applicants: Satoshi Hirata, Kanagawa (JP); Nobuyuki Satoh, Kanagawa (JP); Yasuyuki Suzuki, Saitama (JP); Hideaki Suzuki, Kanagawa (JP); Satoshi Iwanami, Kanagawa (JP); Mamoru Yorimoto, Kanagawa (JP); Masayuki Fujii, Kanagawa (JP); Masato Kobayashi, Kanagawa (JP); Hiroshi Matsumoto, Kanagawa (JP)

(72) Inventors: Satoshi Hirata, Kanagawa (JP); Nobuyuki Satoh, Kanagawa (JP); Yasuyuki Suzuki, Saitama (JP); Hideaki Suzuki, Kanagawa (JP); Satoshi Iwanami, Kanagawa (JP); Mamoru Yorimoto, Kanagawa (JP); Masayuki Fujii, Kanagawa (JP); Masato Kobayashi, Kanagawa (JP); Hiroshi Matsumoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/482,499

(22) Filed: Sep. 10, 2014

(65) Prior Publication Data

US 2015/0070737 A1 Mar. 12, 2015

(30) Foreign Application Priority Data

Sep. 12, 2013 (JP) ................................ 2013-189075
Aug. 28, 2014 (JP) ................................ 2014-174583

(51) Int. Cl.
H04N 1/56 (2006.01)
H04N 1/50 (2006.01)
H04N 1/60 (2006.01)

(52) U.S. Cl.
CPC .................................. H04N 1/6044 (2013.01)

(58) Field of Classification Search
USPC .................................................... 358/504, 1.9
See application file for complete search history.

(56) References Cited

U.S. PATENT DOCUMENTS

| | | | | |
|---|---|---|---|---|
| 4,905,036 | A * | 2/1990 | Asano et al. | 355/401 |
| 7,055,925 | B2 * | 6/2006 | Subirada et al. | 347/19 |
| 8,279,491 | B2 * | 10/2012 | Ishibashi | B41J 2/2135 347/107 |
| 8,964,251 | B2 * | 2/2015 | Matsuzaki | G03G 13/01 358/1.9 |
| 9,004,668 | B2 * | 4/2015 | Saita | C09D 11/30 347/102 |
| 2006/0256214 | A1 * | 11/2006 | MacLean et al. | 348/234 |
| 2012/0069411 | A1 | 3/2012 | Satoh et al. | |
| 2012/0133961 | A1 * | 5/2012 | Henderson | 358/1.9 |
| 2012/0236308 | A1 | 9/2012 | Satoh | |
| 2013/0027720 | A1 | 1/2013 | Satoh | |
| 2013/0027721 | A1 | 1/2013 | Kobayashi et al. | |
| 2013/0135484 | A1 | 5/2013 | Satoh et al. | |
| 2013/0208289 | A1 | 8/2013 | Satoh et al. | |
| 2013/0229671 | A1 | 9/2013 | Yokozawa et al. | |
| 2013/0242319 | A1 | 9/2013 | Suzuki et al. | |
| 2013/0242320 | A1 | 9/2013 | Suzuki et al. | |
| 2013/0242321 | A1 | 9/2013 | Okada et al. | |
| 2013/0242361 | A1 | 9/2013 | Matsumoto et al. | |
| 2013/0258368 | A1 | 10/2013 | Shigemoto et al. | |
| 2013/0258369 | A1 | 10/2013 | Suzuki et al. | |

FOREIGN PATENT DOCUMENTS

JP  2012-063270  3/2012

* cited by examiner

Primary Examiner — Allen H Nguyen
(74) Attorney, Agent, or Firm — Duft Bornsen & Fettig LLP

(57) ABSTRACT

A glossiness determining device includes: a light source; a two-dimensional sensor that receives reflected light containing a specular reflection component of a subject illuminated by the light source, and outputs an image of the subject; and a determining unit that determines glossiness of the subject by using a saturated image, which is the image of the subject output by the two-dimensional sensor and in which pixel values of a partial area are saturated.

12 Claims, 25 Drawing Sheets

| PATCH NUMBER | INITIAL REFERENCE RGB VALUE (RdGdBd) | | | Ld | ad | bd | Xd | Yd | Zd |
|---|---|---|---|---|---|---|---|---|---|
| | Rd | Gd | Bd | | | | | | |
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| | | | | | | | | | |
| ... | | | | | | | | | |
| 72 | | | | | | | | | |

(a)

(b)

GLOSSINESS DETERMINING DEVICE, COLOR MEASURING DEVICE, IMAGE FORMING APPARATUS, AND GLOSSINESS DETERMINATION METHOD

CROSS-REFERENCE TO RELATED APPLICATIONS

The present application claims priority to and incorporates by reference the entire contents of Japanese Patent Application No. 2013-189075 filed in Japan on Sep. 12, 2013 and Japanese Patent Application No. 2014-174583 filed in Japan on Aug. 28, 2014.

BACKGROUND OF THE INVENTION

1. Field of the Invention

The present invention relates to a glossiness determining device, a color measuring device, an image forming apparatus, and a glossiness determination method.

2. Description of the Related Art

In image forming apparatuses, such as printers, a process called color management is performed to suppress variations in outputs due to device-specific characteristics and enhance the reproducibility of outputs with respect to inputs. The color management is to perform color conversion between a standard color space and device dependent colors based on a device profile (ICC profile) in which device-specific characteristics are written, and enhance the reproducibility of output images. When the device profile is generated or corrected, an image forming apparatus actually forms a test pattern, in which a number of reference color charts (patches) are arrayed, on a sheet and performs color measurement on each of the patches contained in the test pattern.

As a color measuring device that performs the color measurement on the patches, a spectrophotometric color measuring device is widely used. The spectrophotometric color measuring device can obtain spectral reflectivity for each wavelength, and therefor can perform the color measurement with high accuracy. However, the spectrophotometric color measuring device is expensive, and thus there is a need to perform the color measurement with high accuracy by using a less expensive device.

As an example of a method of realizing the color measurement with high accuracy at low cost, there is a method of capturing an image of the patches by an image capturing device, and converting RGB values of the patches obtained by the image capturing to color specification values in the standard color space. For example, Japanese Laid-open Patent Publication No. 2012-63270 describes a color measuring device that, by using a two-dimensional sensor, simultaneously captures an image of color measurement target patches formed on a sheet and a reference chart containing multiple reference patches having color specification values specified in advance, and calculates color measurement values of the color measurement target patches based on RGB values of the color measurement target patches and RGB values of the reference patches that are contained in captured images.

However, in the color measuring device described in Japanese Laid-open Patent Publication No. 2012-63270, it is impossible to obtain the glossiness of a subject having its image captured by the two-dimensional sensor.

In view of the above, there is a need to provide a glossiness determining device, a color measuring device, an image forming apparatus, and a glossiness determination method capable of obtaining the glossiness of a subject having its image captured by a two-dimensional sensor.

SUMMARY OF THE INVENTION

It is an object of the present invention to at least partially solve the problems in the conventional technology.

A glossiness determining device includes: a light source; a two-dimensional sensor that receives reflected light containing a specular reflection component of a subject illuminated by the light source, and outputs an image of the subject; and a determining unit that determines glossiness of the subject by using a saturated image, which is the image of the subject output by the two-dimensional sensor and in which pixel values of a partial area are saturated.

A glossiness determination method is performed by a glossiness determining device that includes a light source, a two-dimensional sensor, and a determining unit. The glossiness determination method includes: receiving reflected light containing a specular reflection component of a subject illuminated by the light source and outputting an image of the subject by the two-dimensional sensor; and determining, by the determining unit, glossiness of the subject by using a saturated image, which is the image of the subject output by the two-dimensional sensor and in which pixel values of a partial area are saturated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a glossiness determining device, a color measuring device, an image forming apparatus, and a glossiness determination method will be described in detail below with reference to the accompanying drawings. In the embodiments described below, an inkjet printer is described as an example of an image forming apparatus to which the present invention is applied. However, the present invention is widely applicable to various types of image forming apparatuses that output images on recording media.

Mechanical Configuration of Image Forming Apparatus

Figure 1:
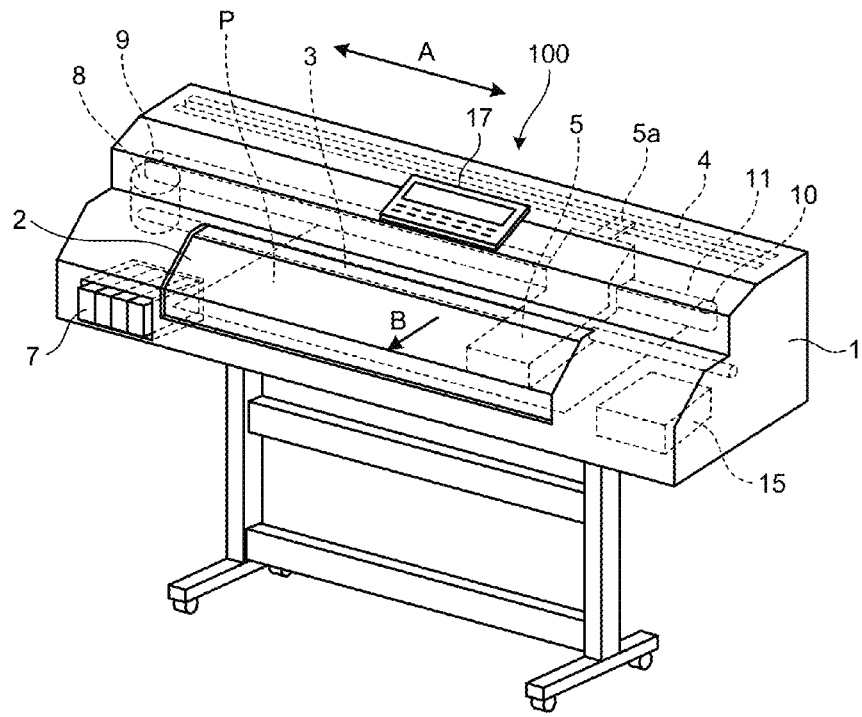
FIG. 1 is a perspective view illustrating the inside of an image forming apparatus in a see-through manner.
Figure 2:
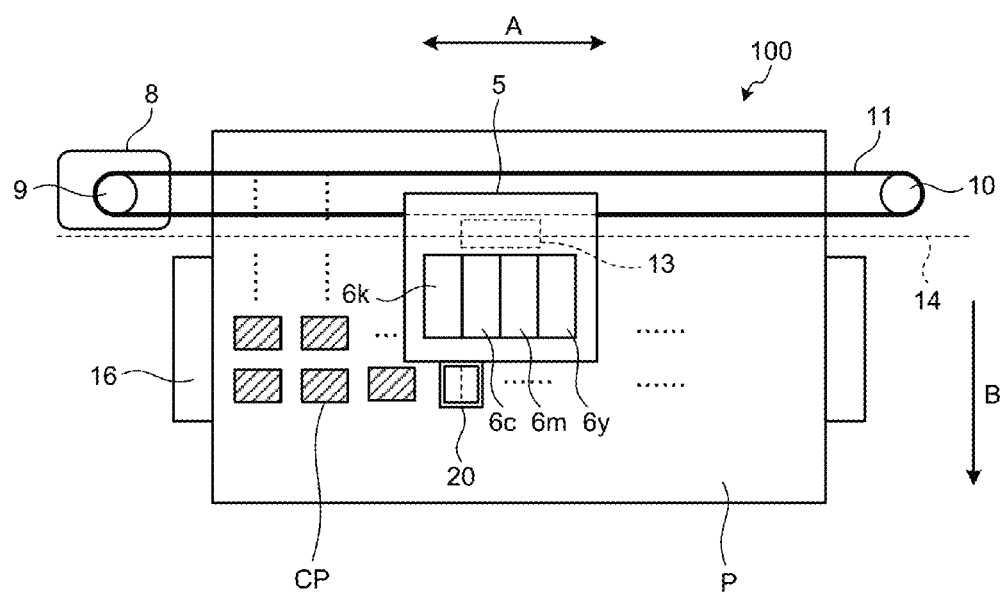
FIG. 2 is a top view illustrating a mechanical configuration of the inside of the image forming apparatus.
Figure 3:
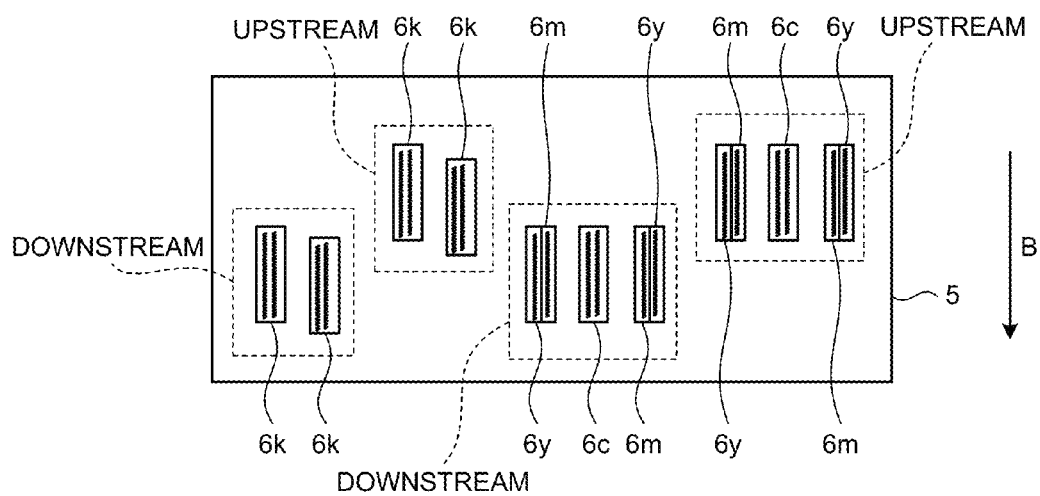
FIG. 3 is a view for explaining an example of arrangement of recording heads mounted on a carriage.

First, a mechanical configuration of an image forming apparatus 100 according to an embodiment will be described with reference to FIG. 1 to FIG. 3. FIG. 1 is a perspective view illustrating the inside of the image forming apparatus 100 of the present embodiment in a see-through manner. FIG. 2 is a top view illustrating a mechanical configuration of the inside of the image forming apparatus 100 of the present embodiment. FIG. 3 is a view for explaining an example of arrangement of a recording head 6 mounted on a carriage 5.

As illustrated in FIG. 1, the image forming apparatus 100 of the present embodiment includes the carriage 5 (an image forming unit) that reciprocates in a main-scanning direction (direction of arrow A in FIG. 1) and forms an image on a sheet P that is intermittently conveyed in a sub-scanning direction (direction of arrow B in FIG. 1). The carriage 5 is supported by a main guide rod 3 extending in the main-scanning direction. Further, the carriage 5 is provided with a connection piece 5a. The connection piece 5a engages with a sub guide member 4 arranged parallel to the main guide rod 3, and stabilizes the posture of the carriage 5.

On the carriage 5, as illustrated in FIG. 2, a recording head 6y that ejects yellow (Y) ink, a recording head 6m that ejects magenta (M) ink, a recording head 6c that ejects cyan (C) ink, and a recording head 6k that ejects black (Bk) ink (hereinafter, the recording heads 6y, 6m, 6c, and 6k may be collectively referred to as the "recording head 6"). The recording head 6 is mounted on the carriage 5 with an ejection surface (nozzle surface) face downward (to a sheet P side).

A cartridge 7 serving as an ink supplier for supplying ink to the recording head 6 is not mounted on the carriage 5, but is arranged at a predetermined position in the image forming apparatus 100. The cartridge 7 and the recording head 6 are connected by a pipe (not illustrated), and ink is supplied from the cartridge 7 to the recording head 6 through the pipe.

The carriage 5 is connected to a timing belt 11 stretched across a drive pulley 9 and a driven pulley 10. The drive pulley 9 rotates by drive of a main-scanning motor 8. The driven pulley 10 has a mechanism that adjusts a distance from the drive pulley 9, and serves to apply predetermined tension to the timing belt 11. The carriage 5 reciprocates in the main-scanning direction along with a feeding operation of the timing belt 11 due to the drive of the main-scanning motor 8. The movement of the carriage 5 in the main-scanning direction is, as illustrated in FIG. 2 for example, controlled based on an encoder value that an encoder sensor 13 provided on the carriage 5 detects by detecting a mark of an encoder sheet 14.

The image forming apparatus 100 of the present embodiment further includes a maintenance mechanism 15 that maintains the reliability of the recording head 6. The maintenance mechanism 15 performs cleaning and capping on the ejection surface of the recording head 6, ejection of unnecessary ink from the recording head 6, or the like.

As illustrated in FIG. 2, a platen 16 is arranged at a position facing the ejection surface of the recording head 6. The platen 16 supports the sheet P when ink is ejected from the recording head 6 onto the sheet P. The image forming apparatus 100 of the present embodiment is a wide apparatus in which the carriage 5 moves for a long distance in the main-scanning direction. Therefore, the platen 16 is constructed by connecting multiple plate members in the main-scanning direction (moving direction of the carriage 5). The sheet P is nipped by conveying rollers driven by a sub-scanning motor to be described later, and is intermittently conveyed in the sub-scanning direction on the platen 16.

The recording head 6 includes multiple nozzle arrays, and ejects ink from the nozzle arrays on the sheet P conveyed on the platen 16, to thereby form an image on the sheet P. In the present embodiment, to ensure a large width of an image that can be formed on the sheet P in one scanning of the carriage 5, the recording heads 6 on the upstream side and the recording heads 6 on the downstream side are mounted on the carriage 5 as illustrated in FIG. 3. Further, the recording heads 6k that eject black ink are mounted on the carriage 5 twice as many as each of the recording heads 6y, 6m, and 6c that eject color ink. Furthermore, the recording heads 6y and 6m are arranged side by side in a separate manner. This is to maintain the order of superimposition of colors during the reciprocation operation of the carriage 5 so as not to change the order of colors between the forward movement and the backward movement. Incidentally, the arrangement of the recording head 6 illustrated in FIG. 3 is a mere example, and the arrangement is not limited to that illustrated in FIG. 3.

The above described components of the image forming apparatus 100 of the present embodiment are arranged inside an exterior body 1. A cover member 2 is arranged on the exterior body 1 in an openable and closable manner. When maintenance of the image forming apparatus 100 is performed or when a paper jam occurs, it is possible to perform operations on the components arranged inside the exterior body 1 by opening the cover member 2.

Further, the image forming apparatus 100 according to the present embodiment includes an operation panel 17 (display unit) that displays various information and receives operations from a user. The operation panel 17 is connected to a main control board, which will be described later, inside the exterior body 1 of the main body via a connection cable (not illustrated).

The image forming apparatus 100 of the present embodiment intermittently conveys the sheet P in the sub-scanning direction on the platen 16, and while the conveyance of the sheet P in the sub-scanning direction is being suspended, ejects ink from the nozzle arrays of the recording head 6 mounted on the carriage 5 onto the sheet P on the platen 16 while moving the carriage 5 in the main-scanning direction, to thereby form an image on the sheet P.

In particular, at the time of adjustment to perform color adjustment on the image forming apparatus 100, the recording head 6 mounted on the carriage 5 ejects ink from the nozzle arrays onto the sheet P on the platen 16, and a test pattern is formed, in which a number of color measurement target patches CP are arrayed. Then, color measurement is performed on each of the color measurement target patches CP contained in the test pattern. Each of the color measurement target patches CP contained in the test pattern is an image that is obtained by the image forming apparatus 100 by outputting a corresponding reference color patch, and reflects output characteristics specific to the image forming apparatus 100. Therefore, it is possible to generate or correct a device profile, in which the characteristics specific to the image forming apparatus 100 are written, by using color measurement values of the color measurement target patches CP. Further, by performing color conversion between a standard color space and device dependent colors based on the device profile, the image forming apparatus 100 can output an image with high reproducibility.

The image forming apparatus 100 of the present embodiment includes a color measuring camera 20 (color measuring device) that performs color measurement on each of the color measurement target patches CP contained in the test pattern formed on the sheet P. The color measuring camera 20 uses, as subjects, the color measurement target patches CP contained in the test pattern that the image forming apparatus 100 has formed on the sheet P, and simultaneously captures the image of the color measurement target patches CP and a reference chart to be described later. Then, the color measuring camera 20 calculates color measurement values of the color measurement target patches CP by using RGB values of the color measurement target patches CP and RGB values of respective reference patches contained in the reference chart, where the RGB values are obtained by the image capturing.

As illustrated in FIG. 2, the color measuring camera 20 is fixed to the carriage 5 and reciprocates in the main-scanning direction together with the carriage 5. When moving to a position facing each of the color measurement target patches CP contained in the test pattern formed on the sheet P on the platen 16, the color measuring camera 20 simultaneously captures the image of each of the color measurement target patches CP and the reference chart. Meanwhile, the simultaneous image capturing herein means that image data of a single frame containing each of the color measurement target patches CP and the reference chart is obtained. That is, even if there is a difference in data acquisition time between pixels, if image data containing each of the color measurement target patches CP and the reference chart in a single frame is acquired, it means that the images of each of the color measurement target patches CP and the reference chart are simultaneously captured.

Further, the color measuring camera 20 has a function (glossiness determining device) to captures an image of, as a subject, a blank area, in which the color measurement target patches CP are not formed on the sheet P, and determines glossiness of the sheet P by using the obtained image in advance of the color measurement on the color measurement target patches CP. When the glossiness of the sheet P is to be determined, the blank area of the sheet P serving as the subject is illuminated by a glossiness determination light source to be described later. The glossiness determination light source is arranged such that specular reflection light enters a two-dimensional sensor to be described later. Therefore, depending on the amount of light of the glossiness determination light sources, an image of the subject output by the two-dimensional sensor may be an image in which pixel values of a partial area are saturated (hereinafter, referred to as a saturated image). The color measuring camera 20 determines the glossiness of the subject illuminated by the glossiness determination light source, by using the saturated image.

Specific Example of Color Measuring Camera

Figure 4A:
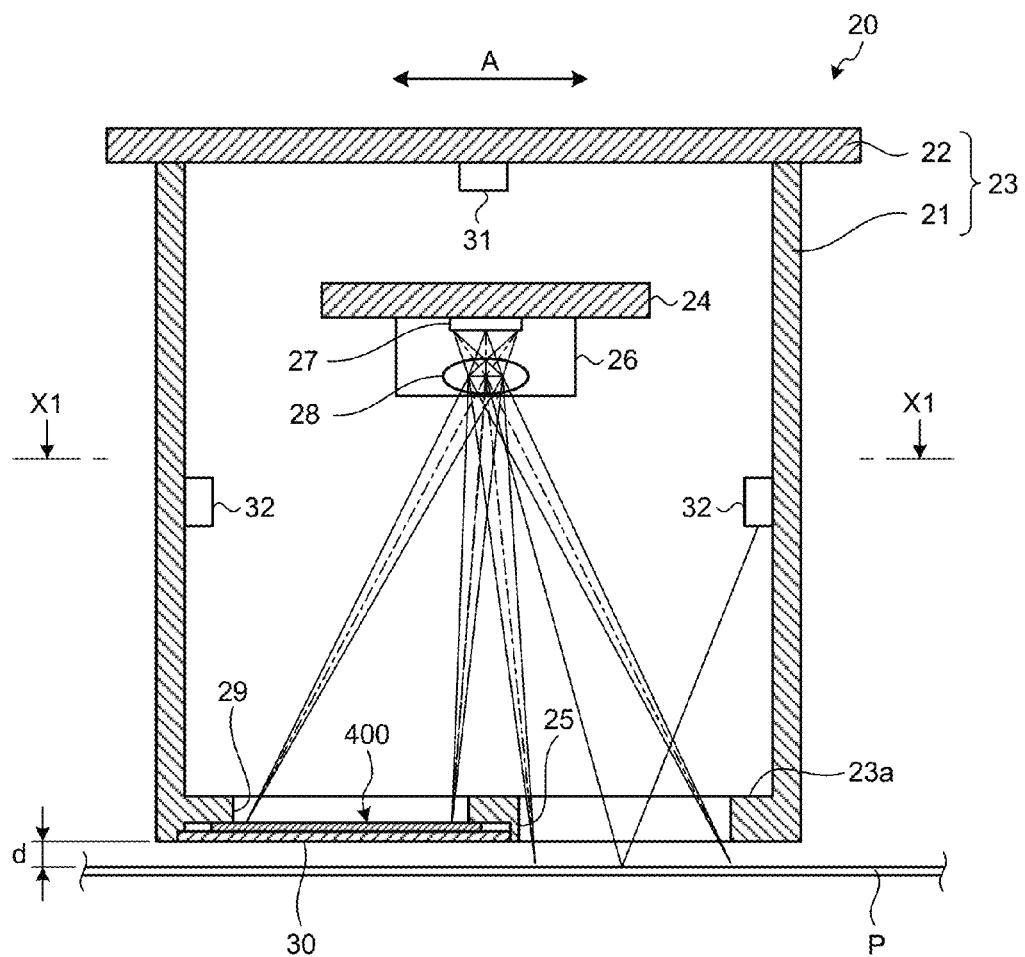
FIG. 4A is a vertical cross-sectional view of a color measuring camera.
Figure 4B:
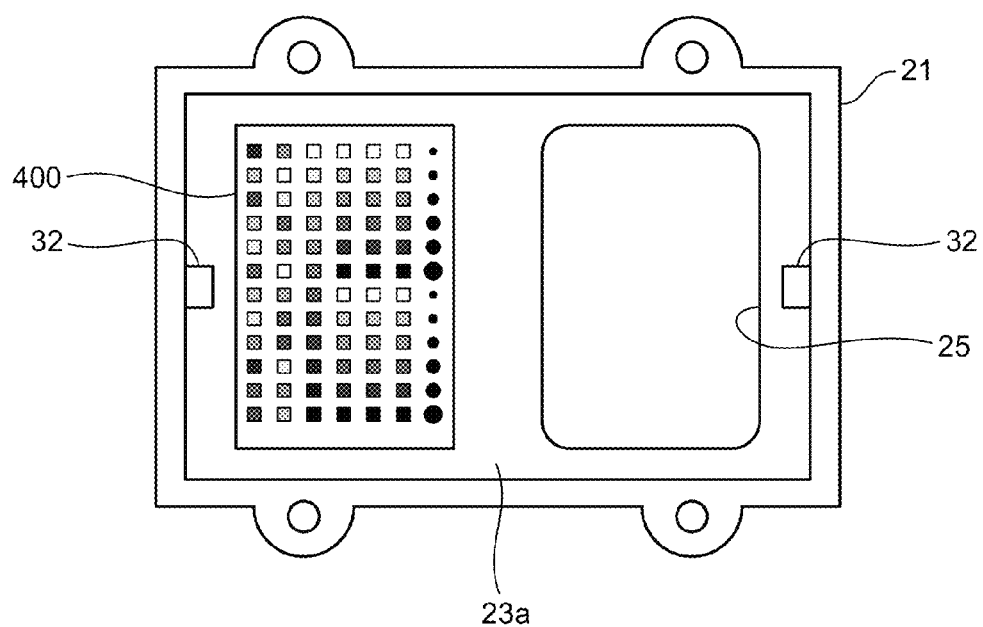
FIG. 4B is a plan view of a bottom surface of a housing of the color measuring camera viewed in an X1 direction in FIG. 4A.

Next, with reference to FIG. 4A and FIG. 4B, a specific example of the color measuring camera 20 will be described in detail. FIG. 4A and FIG. 4B are views illustrating a specific example of the color measuring camera 20. FIG. 4A is a vertical cross-sectional view of the color measuring camera 20. FIG. 4B is a plan view of a bottom surface 23a of a housing 23 of the color measuring camera 20 viewed in an X1 direction in FIG. 4A.

The color measuring camera 20 includes the housing 23 constructed by combining a frame 21 and a board 22. The frame 21 is formed in a bottomed tubular shape, in which one end side forming an upper surface of the housing 23 is opened. The board 22 is fastened to the frame 21 with a fastening manner and integrated with the frame 21 so as to close the open end of the frame 21 and constructs the upper surface of the housing 23.

The housing 23 is fixed to the carriage 5 such that the bottom surface 23a faces the sheet P on the platen 16 with a predetermined gap d interposed therebetween. The bottom surface 23a of the housing 23 facing the sheet P is provided with an opening 25 that allows an image of a subject (the color measurement target patches CP in the case of color adjustment) to be captured from the inside of the housing 23.

A sensor unit 26 that captures an image is provided inside the housing 23. The sensor unit 26 includes a two-dimensional sensor 27, such as a CCD sensor or a CMOS sensor, and an image forming lens 28 that forms an optical image in an image capturing target area of the sensor unit 26 onto a sensor surface of the two-dimensional sensor 27. The two-dimensional sensor 27 is mounted on, for example, a sensor board 24 supported by a supporting member (not illustrated) such that the sensor surface faces the bottom surface 23a side of the housing 23. The image forming lens 28 is fixed such that its position with respect to the two-dimensional sensor 27 is determined so as to maintain a positional relation determined according to the optical characteristic thereof.

On the bottom surface 23a of the housing 23, another opening 29 is provided adjacent to the opening 25 that allows the sensor unit 26 to capture an image of a subject outside the housing 23. Further, a reference chart 400 is arranged so as to close the opening 29 from the outside of the housing 23, and is held by a holder member 30. The holder member 30 is removably attached to the housing 23. Therefore, it is possible to replace the reference chart 400 by removing the holder member 30 from the housing 23.

The image of the reference chart 400 is captured together with the image of each of the color measurement target patches CP by the sensor unit 26 when color measurement is performed on the color measurement target patches CP. That is, the reference chart 400 is arranged on the bottom surface 23a of the housing 23 so as to be included in the image capturing target area of the sensor unit 26 together with each of the color measurement target patches CP outside the housing 23. In the image capturing target area of the sensor unit 26, an area that is outside the housing 23 and to be captured via the opening 25 will be hereinafter described as a subject area. Details of the reference chart 400 will be described later.

A color measurement light source 31 that illuminates the image capturing target area of the sensor unit 26 at the time of color measurement on the subject is provided inside the housing 23. As the color measurement light source 31, for example, a light emitting diode (LED) is used. The color measurement light source 31 is mounted on, for example, the inner surface side of the board 22. However, the color measurement light source 31 need not always be directly mounted on the board 22 as long as it is arranged at a position where the image capturing target area of the sensor unit 26 can be illuminated approximately uniformly. Further, while an LED is used as the color measurement light source 31 in the present embodiment, a type of the light source is not limited to the LED. For example, it may be possible to use an organic EL as the color measurement light source 31. If the organic EL is used as the color measurement light source 31, it is possible to obtain illumination light with a spectral distribution similar to that of sunlight, so that it is expectable to improve the accuracy of color measurement.

Meanwhile, to illuminate the subject area outside the housing 23 under the same illumination conditions as those for the reference chart 400 arranged inside the housing 23, it is necessary to block external light from entering the subject area at the time of image capturing by the sensor unit 26 and illuminate the color measurement target patches CP only with the illumination light from the color measurement light source 31. To prevent the external light from entering the subject area, it is effective to reduce the gap d between the bottom surface 23a of the housing 23 and the sheet P such that the external light is blocked by the housing 23. However, if the gap d between the bottom surface 23a of the housing 23 and the sheet P is reduced too much, the sheet P comes in contact with the bottom surface 23a of the housing 23, and it becomes difficult to appropriately capture an image. Therefore, it is preferable to set the gap d between the bottom surface 23a of the housing 23 and the sheet P to a small value within a range in which the sheet P does not come in contact with the bottom surface 23a of the housing 23, by taking into account the flatness of the sheet P. For example, if the gap d between the bottom surface 23a of the housing 23 and the sheet P is set to about 1 mm to 2 mm, it is possible to prevent the color measurement target patches CP formed on the sheet P from being illuminated with the external light, while preventing the sheet P from coming in contact with the bottom surface 23a of the housing 23.

Further, if the gap d between the bottom surface 23a of the housing 23 and the sheet P is reduced, it becomes possible to set a difference between an optical path length from the sensor unit 26 to the subject outside the housing 23 and an optical path length from the sensor unit 26 to the reference chart 400 to be within a range of the depth of field of the sensor unit 26. The color measuring camera 20 of the present embodiment is configured to simultaneously capture the image of the subject outside the housing 23 and the reference chart 400 arranged on the housing 23 by the sensor unit 26. Therefore, if the difference between the optical path length from the sensor unit 26 to the subject and the optical path length from the sensor unit 26 to the reference chart 400 exceeds the range of the depth of field of the sensor unit 26, it is not possible to capture an image focusing on both of the subject and the reference chart 400.

The difference between the optical path length from the sensor unit 26 to the subject outside the housing 23 and the optical path length from the sensor unit 26 to the reference chart 400 is approximately a value obtained by adding the gap d to a thickness of the reference chart 400 and the holder member 30. Therefore, if the gap d is set to a sufficiently small value, it becomes possible to set the difference between the optical path length from the sensor unit 26 to the subject outside the housing 23 and the optical path length from the sensor unit 26 to the reference chart 400 to be within the range of the depth of field of the sensor unit 26, and capture an image focusing on both of the subject and the reference chart 400. For example, if the gap d is set to about 1 mm to 2 mm, it is possible to set the difference between the optical path length from the sensor unit 26 to the subject outside the housing 23 and the optical path length from the sensor unit 26 to the reference chart 400 to be within the range of the depth of field of the sensor unit 26.

Incidentally, the depth of field of the sensor unit 26 is a characteristic unique to the sensor unit 26 and is determined according to an aperture value of the sensor unit 26, a focal length of the image forming lens 28, a distance between the sensor unit 26 and the subject, or the like. In the color measuring camera 20 of the present embodiment, the sensor unit 26 is designed such that when the gap d between the bottom surface 23a of the housing 23 and the sheet P is set to a sufficiently small value around 1 mm to 2 mm for example, the difference between the optical path length from the sensor unit 26 to the subject outside the housing 23 and the optical path length from the sensor unit 26 to the reference chart 400 falls within the range of the depth of field.

Further, glossiness determination light sources 32 that illuminate at least the subject area at the time of determination of the glossiness of a subject are provided inside the housing 23. The glossiness determination light sources 32 are arranged at positions such that specular reflection light (a specular reflection component of reflected light) that is specularly reflected from the subject area upon emission of light from the light source enters the two-dimensional sensor 27 of the sensor unit 26. The color measuring camera 20 of the present embodiment can determine the glossiness of the subject by a method using an image of the subject area illuminated by the glossiness determination light sources 32, as will be described later. Incidentally, in the configuration example of the color measuring camera 20 illustrated in FIG. 4A and FIG. 4B, the glossiness determination light sources 32 are provided on not only the opening 25 side but also on the opening 29 side inside the housing 23. Therefore, by illuminating the reference chart 400 by the glossiness determination light source 32 on the opening 29 side, it is possible to determine the glossiness of the reference chart 400 by the same method.

Specific Example of Reference Chart

Figure 5:
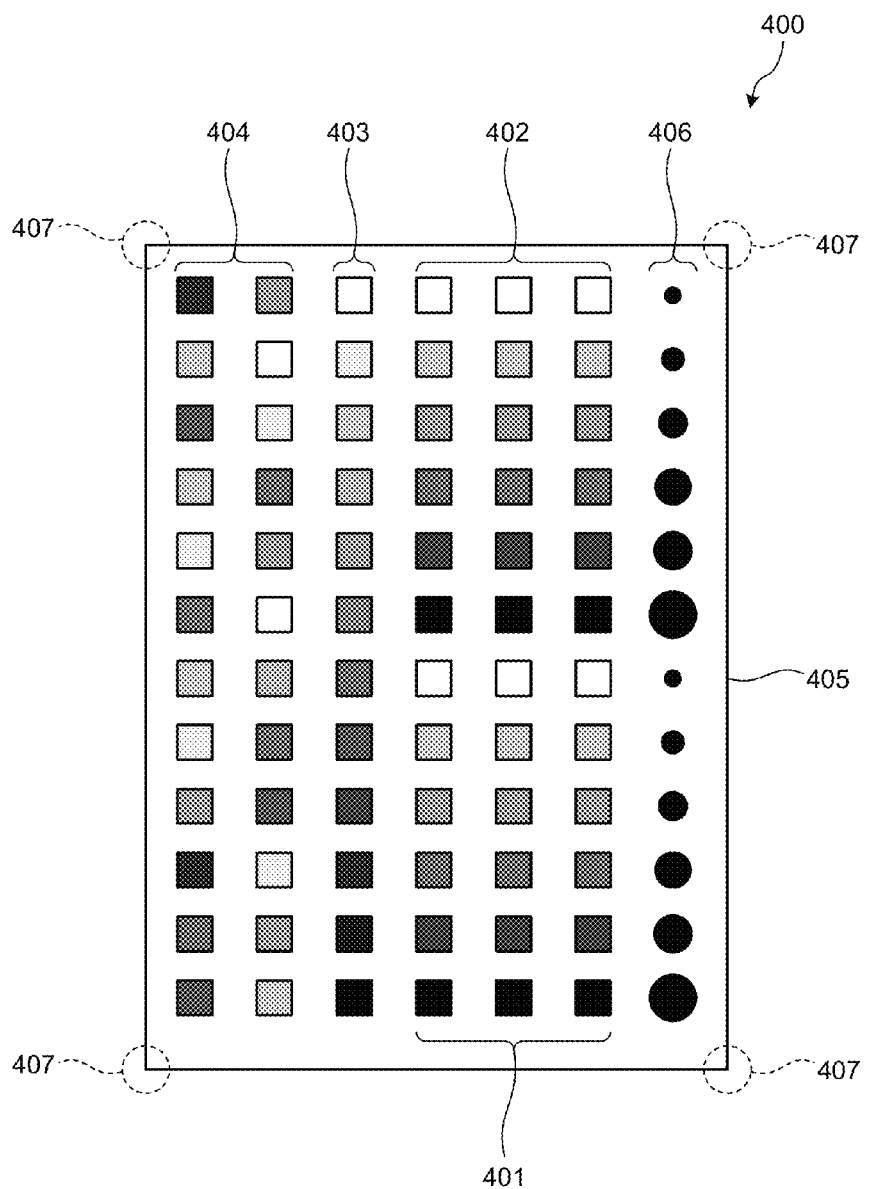
FIG. 5 is a view illustrating a specific example of a reference chart.

Next, with reference to FIG. 5, the reference chart 400 arranged on the housing 23 of the color measuring camera 20 will be described in detail. FIG. 5 is a view illustrating a specific example of the reference chart 400.

The reference chart 400 illustrated in FIG. 5 contains multiple reference patch arrays 401 to 404, in each of which color measurement patches are arrayed, a dot diameter measurement pattern array 406, a distance measurement line 405, and chart position specification markers 407.

The reference patch arrays 401 to 404 include the reference patch array 401 in which reference patches of YMCK primary colors are arrayed in order of gradation, the reference patch array 402 in which reference patches of RGB secondary colors are arrayed in order of gradation, the reference patch array 403 in which grayscale reference patches are arrayed in order of gradation, and the reference patch array 404 in which reference patches of tertiary colors are arrayed. The dot diameter measurement pattern array 406 is a pattern array, which is for measurement of a geometric configuration and in which circular patterns with different sizes are arrayed in order of size, and can be used to measure a dot diameter of an image recorded on the sheet P.

The distance measurement line 405 formed as a rectangular frame surrounding the multiple reference patch arrays 401 to 404 and the dot diameter measurement pattern array 406. The chart position specification markers 407 are arranged at four corner positions of the distance measurement line 405, and function as markers for specifying the position of each of the reference patches. By specifying the distance measurement line 405 and the chart position specification markers 407 at the four corners from image data of the reference chart 400 captured by the sensor unit 26, it is possible to specify the position of the reference chart 400 and the position of each of the reference patches and the patterns.

Each of the reference patches included in the color measurement reference patch arrays 401 to 404 is used as a reference of color reflecting the image capturing conditions of the color measuring camera 20. Meanwhile, the configurations of the color measurement reference patch arrays 401 to 404 arranged in the reference chart 400 are not limited to the example illustrated in FIG. 5, and arbitrary reference patch arrays are applicable. For example, it may be possible to use a reference patch that can specify a color range as wide as possible, or the reference patch array 401 of the YMCK primary colors or the grayscale reference patch array 403 may be formed of patches having color measurement values of the ink used in the image forming apparatus 100. Further, the reference patch array 402 of the RGB secondary colors may be formed of patches with color measurement values that can produce color by the ink used in the image forming apparatus 100, or it may be possible to use a standard color chart in which color measurement values, such as Japan Color Incidentally, while the reference chart 400 including the reference patch arrays 401 to 404 having a general patch (color chart) form is used in the present embodiment, the reference chart 400 need not always be in the form including the reference patch arrays 401 to 404 as described above. It is sufficient that the reference chart 400 is configured such that multiple colors that can be used for color measurement are arranged so that the respective positions can be specified.

Schematic Configuration of Control Mechanism of Image Forming Apparatus

Figure 6:
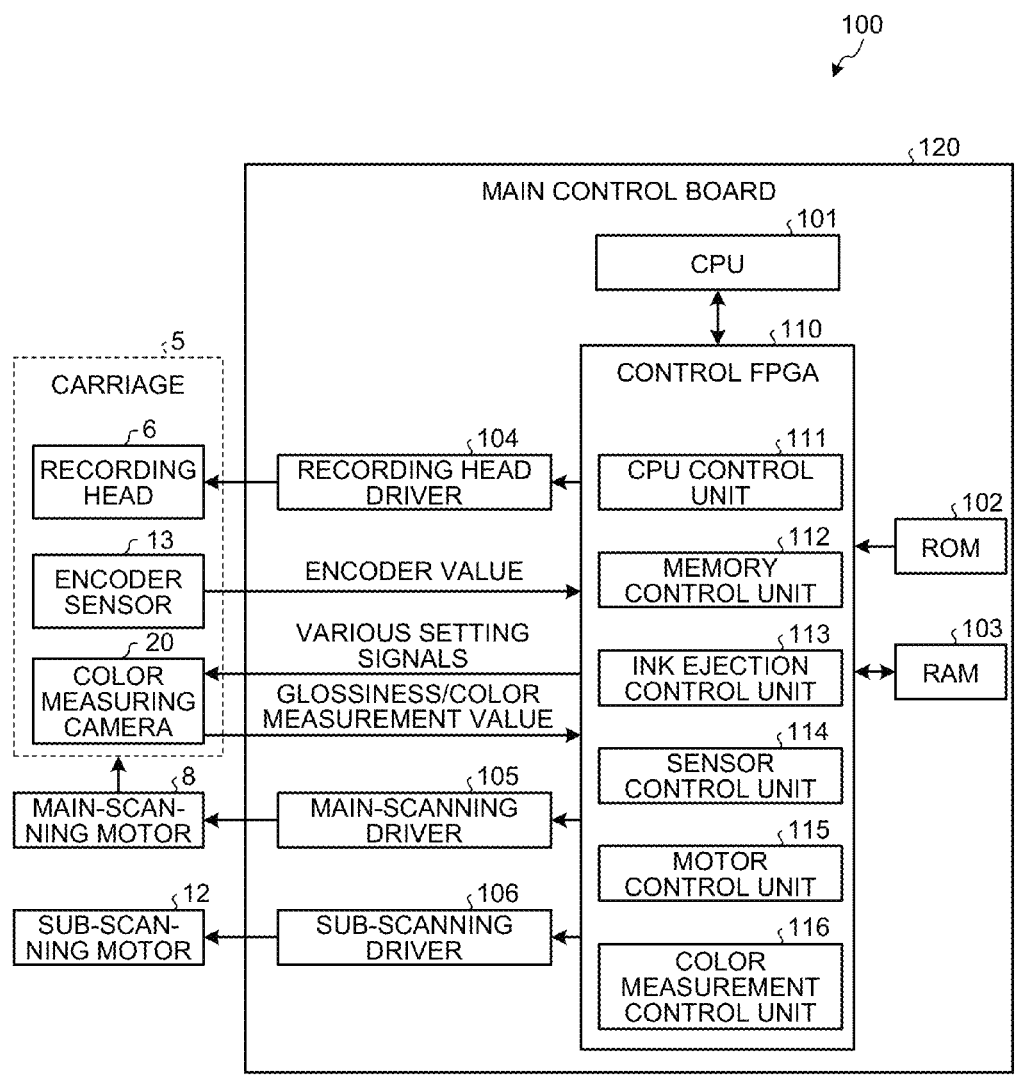
FIG. 6 is a block diagram illustrating a schematic configuration of a control mechanism of the image forming apparatus.

Next, with reference to FIG. 6, a schematic configuration of a control mechanism of the image forming apparatus 100 of the present embodiment will be described. FIG. 6 is a block diagram illustrating a schematic configuration of the control mechanism of the image forming apparatus 100.

The image forming apparatus 100 of the present embodiment includes, as illustrated in FIG. 6, a CPU 101, a ROM 102, a RAM 103, a recording head driver 104, a main-scanning driver 105, a sub-scanning driver 106, a control field-programmable gate array (FPGA) 110, the recording head 6, the color measuring camera 20, the encoder sensor 13, the main-scanning motor 8, and a sub-scanning motor 12. The CPU 101, the ROM 102, the RAM 103, the recording head driver 104, the main-scanning driver 105, the sub-scanning driver 106, and the control FPGA 110 are mounted on a main control board 120. The recording head 6, the encoder sensor 13, and the color measuring camera 20 are mounted on the carriage 5 as described above.

The CPU 101 controls the entire image forming apparatus 100. For example, the CPU 101 executes various control programs stored in the ROM 102 by using the RAM 103 as a working area, and outputs control commands to control various operations in the image forming apparatus 100.

The recording head driver 104, the main-scanning driver 105, and the sub-scanning driver 106 are drivers that drive the recording head 6, the main-scanning motor 8, and the sub-scanning motor 12, respectively.

The control FPGA 110 controls various operations in the image forming apparatus 100 in cooperation with the CPU 101. The control FPGA 110 includes, as functional components, for example, a CPU control unit 111, a memory control unit 112, an ink ejection control unit 113, a sensor control unit 114, a motor control unit 115, and a color measurement control unit 116.

The CPU control unit 111 performs communication with the CPU 101 to send various information acquired by the control FPGA 110 to the CPU 101 and input control commands output from the CPU 101.

The memory control unit 112 performs memory control to cause the CPU 101 to access the ROM 102 or the RAM 103.

The ink ejection control unit 113 controls operations of the recording head driver 104 according to control commands from the CPU 101, and controls a timing to eject ink from the recording head 6 driven by the recording head driver 104.

The sensor control unit 114 performs processes on a sensor signal, such as an encoder value, output from the encoder sensor 13.

The motor control unit 115 controls operations of the main-scanning driver 105 according to control commands from the CPU 101, and controls the main-scanning motor 8 driven by the main-scanning driver 105 to control movement of the carriage 5 in the main-scanning direction. Further, the motor control unit 115 controls operations of the sub-scanning driver 106 according to a control command from the CPU 101, and controls the sub-scanning motor 12 driven by the sub-scanning driver 106 to control movement of the sheet P on the platen 16 in the sub-scanning direction.

The color measurement control unit 116 controls color measurement on the color measurement target patches CP performed by the color measuring camera 20, in cooperation with the CPU 101. For example, the color measurement control unit 116 sets a wait time to start the color measurement on the color measurement target patches CP according to the glossiness of the sheet P determined by the color measuring camera 20, and controls each unit of the image forming apparatus 100 such that the color measurement on the color measurement target patches CP using the color measuring camera 20 starts after the wait time has elapsed. The wait time according to the glossiness of the sheet P can be set by storing a table containing the glossiness of the sheet P and a wait time in an associated manner in the ROM 102, and referring the table for example. The table can be generated by, for example, obtaining the glossiness for each sheet type of the sheet P in advance by experiment or the like, obtaining, as a wait time, a time to dry the color measurement target patches CP when the color measurement target patches CP are formed on the sheet P of each sheet type, and associating the sheet type and the time with each other.

Further, the color measurement control unit 116, when setting the wait time to start the color measurement on the color measurement target patches CP, may display a remaining time of the wait time on the operation panel 17. Accordingly, it becomes possible to notify a user when the color measurement on the color measurement target patches CP starts, and alleviate the feeling of anxiety of the user due to non-start of the color measurement on the color measurement target patches CP.

Incidentally, each of the above units is an example of a control function implemented by the control FPGA 110, and the control FPGA 110 may be configured to implement various control functions other than the above. Further, all or part of the above described control functions may be implemented by a program executed by the CPU 101 or other general purpose CPUs. Furthermore, all or part of the above described control functions may be implemented by special hardware, such as other FPGAs different from the control FPGA 110 or an application specific integrated circuit (ASIC).

The recording head 6 is driven by the recording head driver 104 that is operated and controlled by the CPU 101 and the control FPGA 110, and ejects ink onto the sheet P on the platen 16 to form an image.

The color measuring camera 20 captures the image of the color measurement target patches CP contained in the test pattern and the reference chart 400 at the time of adjustment when the color adjustment is performed on the image forming apparatus 100 as described above, and calculates color measurement values of the color measurement target patches CP (color specification values in the standard color space; for example, L*a*b* values in the L*a*b* color space (hereinafter, L*a*b* is described as "Lab")), based on RGB values of the color measurement target patches CP and RGB values of the respective reference patches of the reference chart 400 obtained from a captured image. The color measurement values of the color measurement target patches CP calculated by the color measuring camera 20 are sent to the CPU 101 via the control FPGA 110.

Further, in advance of the color measurement on the color measurement target patches CP, the color measuring camera 20 captures an image of a blank area of the sheet P on which the test pattern is formed (an area where the color measurement target patches CP are not formed), under the illumination by the glossiness determination light source 32. Then, the color measuring camera 20 determines the glossiness of the sheet P on which the test pattern is formed, by using a saturated image obtained by image capturing. Information on the glossiness of the sheet P determined by the color measuring camera 20 is sent to the color measurement control unit 116 of the control FPGA 110.

The encoder sensor 13 outputs an encoder value obtained by detecting a mark on the encoder sheet 14 to the control FPGA 110. The encoder value is sent from the control FPGA 110 to the CPU 101, and is used to calculate the position or speed of the carriage 5 for example. The CPU 101 generates and outputs a control command for controlling the main-scanning motor 8 based on the position or the speed of the carriage 5 calculated from the encoder value.

Configuration of Control Mechanism of Color Measuring Camera

Figure 7:
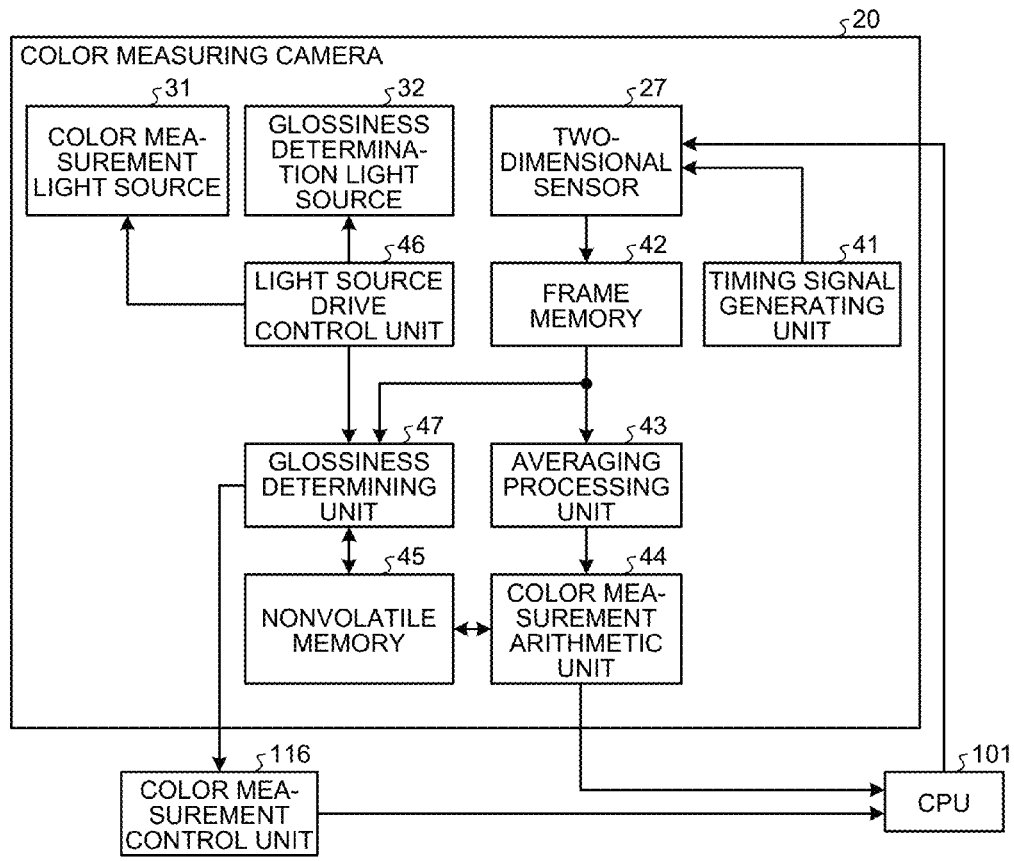
FIG. 7 is a block diagram illustrating a configuration example of a control mechanism of the color measuring camera.

Next, with reference to FIG. 7, a control mechanism of the color measuring camera 20 will be described in detail. FIG. 7 is a block diagram illustrating a configuration example of the control mechanism of the color measuring camera 20.

The color measuring camera 20 includes, as illustrated in FIG. 7, the two-dimensional sensor 27, the color measurement light source 31, the glossiness determination light sources 32, a timing signal generating unit 41, a frame memory 42, an averaging processing unit 43, a color measurement arithmetic unit 44, a nonvolatile memory 45, a light source drive control unit 46, and a glossiness determining unit 47.

The two-dimensional sensor 27 converts light that has entered from the image capturing target area illuminated by the color measurement light source 31 or the glossiness determination light sources 32 via the image forming lens 28 into an analog signal, and outputs a captured image of the image capturing target area. The two-dimensional sensor 27 has a built-in function to perform analog-to-digital conversion to convert the analog signal obtained through photoelectric conversion into digital image data, and perform various image processing, such as shading correction, white balance correction, gamma correction, or image data format conversion, on the image data, and outputs an image obtained through the image processing as a captured image. Meanwhile, part or all of various image processing on the image data may be performed outside the two-dimensional sensor 27.

The timing signal generating unit 41 generates a timing signal that controls a timing to start image capturing by the two-dimensional sensor 27, and supplies the timing signal to the two-dimensional sensor 27. In the present embodiment, the two-dimensional sensor 27 performs image capturing not only when the color measurement is performed on the color measurement target patches CP, but also when the glossiness of the sheet P is determined. The timing signal generating unit 41 generates a timing signal for controlling a timing to start image capturing by the two-dimensional sensor 27 when the color measurement on the color measurement target patches CP is performed and when the glossiness of the sheet P is determined, and supplies the timing signal to the two-dimensional sensor 27.

The frame memory 42 temporarily stores therein captured images output from the two-dimensional sensor 27.

The averaging processing unit 43, when the color measurement on the color measurement target patches CP is to be performed, extracts a color measurement target area which is set near the center of the subject area, and an area in which each of the reference patches of the reference chart 400 appears, from captured images that are output from the two-dimensional sensor 27 and that are temporarily stored in the frame memory 42. Then, the averaging processing unit 43 performs averaging on image data of the extracted color measurement target areas, outputs obtained values as RGB values of the color measurement target patches CP to the color measurement arithmetic unit 44, performs averaging on image data of each area in which each of the reference patches appears, and outputs obtained values as RGBs of the respective reference patches to the color measurement arithmetic unit 44.

The color measurement arithmetic unit 44 calculates the color measurement values of the color measurement target patches CP based on the RGB values of the color measurement target patches CP and the RGB values of each of the reference patches of the reference chart 400, which are obtained through the process by the averaging processing unit 43. The color measurement values of the color measurement target patches CP calculated by the color measurement arithmetic unit 44 are sent to the CPU 101 on the main control board 120. A specific example of the process of calculating the color measurement values of the color measurement target patches CP by the color measurement arithmetic unit 44 will be described in detail later.

The nonvolatile memory 45 stores therein various data needed to calculate the color measurement values of the color measurement target patches CP by the color measurement arithmetic unit 44, a table to be referred to when the glossiness determining unit 47 determines the glossiness of the sheet P, or the like.

The light source drive control unit 46 generates a light source drive signal for driving the color measurement light source 31 or the glossiness determination light sources 32, and supplies the signal to the color measurement light source 31 or the glossiness determination light sources 32. As described above, the color measuring camera 20 of the present embodiment illuminates the image capturing target area of the sensor unit 26 by the color measurement light source 31 at the time of the color measurement on the color measurement target patches CP, and illuminates at least the subject area by the glossiness determination light source 32 at the time of determination of the glossiness of the sheet P. The light source drive control unit 46 generates a light source drive signal for causing the color measurement light source 31 or the glossiness determination light sources 32 to emit a desired amount of light, and supplies the signal to the color measurement light source 31 or the glossiness determination light sources 32. The amount of light emitted from the color measurement light source 31 or the glossiness determination light sources 32 can be changed according to the light source drive signal from the light source drive control unit 46.

The glossiness determining unit 47 determines the glossiness of the sheet P on which the test pattern containing the color measurement target patches CP is formed. The determination of the glossiness of the sheet P is performed in advance of the color measurement on the color measurement target patches CP. When the glossiness of the sheet P is to be determined, a blank area of the sheet P is employed as a subject, and the subject is illuminated by the glossiness determination light source 32. Then, the two-dimensional sensor 27 receives reflected light containing a specular reflection component from the blank area of the sheet P serving as the subject, and outputs a captured image. The glossiness determining unit 47 determines the glossiness of the sheet P by using a saturated image, which is the captured image output by the two-dimensional sensor 27 and in which pixel values of a partial area are saturated.

Figure 8:
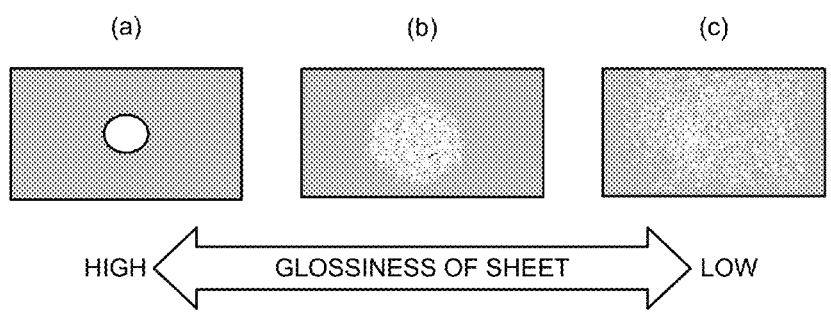
FIG. 8 is a view illustrating a relation between the glossiness of a sheet and captured images output from a two-dimensional sensor.

FIG. 8 is a view illustrating a relation between the glossiness of the sheet P and the captured image output from the two-dimensional sensor 27. As illustrated in FIG. 8(*a*), if the glossiness of the sheet P is high, a large amount of specular reflection light from the sheet P enters the two-dimensional sensor 27, so that the amount of light received in the area where the specular reflection light enters increases, and pixel values in this area tends to be saturated (so-called white-out). On the contrary, as illustrated in FIG. 8(*c*), if the glossiness of the sheet P is low, a diffuse reflection component (diffusely reflected component) increases in the light that enters the two-dimensional sensor 27; therefore, even when the amount of light emitted from the glossiness determination light source 32 is the same as in the case in FIG. 8(*a*), pixel values are less likely to be saturated. Meanwhile, if the amount of light emitted from the glossiness determination light source 32 is increased, pixel values are saturated even when the glossiness of the sheet P is low, and, a range of pixels having saturated pixel values in this case is greater as compared to a case where the glossiness of the sheet P is high. If the glossiness of the sheet P is moderate, as illustrated in FIG. 8(*b*), there is a tendency between the example in FIG. 8(*a*) and the example in FIG. 8(*c*).

As described above, when the image of the blank area of the sheet P is captured as a subject under the illumination by the glossiness determination light sources 32, the saturated image (captured image in which pixel values of a partial area are saturated) output from the two-dimensional sensor 27 is used as information useful to determine the glossiness of the sheet P. Therefore, the glossiness determining unit 47 determines the glossiness of the sheet P by using the saturated image output from the two-dimensional sensor 27 under the illumination by the glossiness determination light source 32. Specific examples of the method of determining the glossiness of the sheet P by the glossiness determining unit 47 by using the saturated image will be described below.

First Method

A first method is a method, in which the amount of light emitted from the glossiness determination light source 32 is gradually increased from a reference light emission amount, with which the two-dimensional sensor 27 does not output a saturated image as a captured image, to an amount, with which the two-dimensional sensor 27 outputs a saturated image, and the glossiness of the sheet P is determined based on an increase in the amount of light emitted from the glossiness determination light source 32 until the two-dimensional sensor 27 outputs the saturated image.

Figure 9:
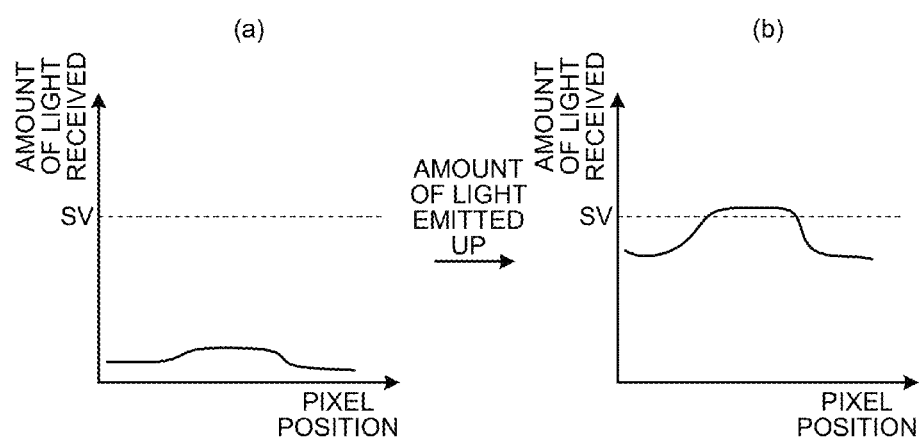
FIG. 9 is a view for explaining a first method of determining the glossiness of a sheet.

FIG. 9 is a view for explaining the first method of determining the glossiness of the sheet P. FIG. 9(*a*) illustrates a distribution of the amount of light received by the two-dimensional sensor 27 when the amount of light emitted from the glossiness determination light source 32 is the reference light emission amount, and FIG. 9(*b*) illustrates a distribution of the amount of light received by the two-dimensional sensor 27 when the amount of light emitted from the glossiness determination light source 32 is increased until the two-dimensional sensor 27 outputs a saturated image. The horizontal axes in the drawings represent pixel positions of the two-dimensional sensor 27, and the vertical axes represent the amounts of light received at the pixel positions. Further, a level of the amount of light received, at which pixel values are saturated (a saturation level SV of pixel values), is represented by a dashed line.

If the amount of light emitted from the glossiness determination light source 32 is gradually increased from the reference light emission amount, as illustrated in FIG. 9(*b*), the amount of light received in a partial area of the two-dimensional sensor 27 exceeds the saturation level SV of pixel values at a certain stage, and the two-dimensional sensor 27 outputs a saturated image. In this case, if the glossiness of the sheet P serving as a subject is high, an increase in the amount of light emitted from the glossiness determination light source 32 until the two-dimensional sensor 27 outputs the saturated image is relatively small. On the contrary, if the glossiness of the sheet P serving as a subject is small, an increase in the amount of light emitted from the glossiness determination light source 32 until the two-dimensional sensor 27 outputs a saturated image is greater as compared to a case where the glossiness of the sheet P is high. Therefore, it is possible to determine the glossiness of the sheet P based on an increase in the amount of light emitted from the glossiness determination light source 32 until the two-dimensional sensor 27 outputs a saturated image.

When the glossiness of the sheet P is determined by the first method, the light source drive control unit 46 controls the amount of light emitted from the glossiness determination light source 32 such that the amount of light emitted is gradually increased from the reference light emission amount. The glossiness determining unit 47 sequentially checks captured images output from the two-dimensional sensor 27 while the amount of light emitted from the glossiness determination light source 32 is gradually increased, and when the two-dimensional sensor 27 outputs a saturated image, acquires, from the light source drive control unit 46, the amount of light emitted from the glossiness determination light source 32 at this time. Then, the glossiness determining unit 47 divides the amount of light emitted from the glossiness determination light source 32 at this time by the reference light emission amount to obtain an increase in the amount of light emitted, and determines the glossiness of the sheet P based on the increase in the amount of light emitted by, for example, referring to a table containing the increase in the amount of light emitted from the glossiness determination light source 32 and the glossiness of the sheet P in an associated manner. It is sufficient to, for example, generate the table by experiment in advance, and store the table in the nonvolatile memory 45. Information on the glossiness of the sheet P determined in this manner is sent to the color measurement control unit 116 of the control FPGA 110 mounted on the main control board 120 as described above.

The amount of light emitted from the glossiness determination light source 32 is gradually increased from the reference light emission amount in the present embodiment. On the contrary, it may be possible to employ, as the reference light emission amount, a light emission amount with which the two-dimensional sensor 27 outputs a saturated image, gradually reduce the amount of light emitted from the glossiness determination light source 32 from the reference light emission amount, and determine the glossiness of the sheet P based on a decrease in the amount of light emitted until the two-dimensional sensor 27 stops outputting a saturated image.

Further, while the amount of light emitted from the glossiness determination light source 32 is changed in the present embodiment, if the glossiness determination light source 32 is movable in a direction in which the glossiness determination light source 32 comes in contact with or away from the subject area, it may be possible to change a distance between the glossiness determination light source 32 and the subject area, instead of changing the amount of light emitted from the glossiness determination light source 32.

Second Method

A second method is a method, in which the amount of light emitted from the glossiness determination light source 32 is gradually increased from a reference light emission amount, with which the two-dimensional sensor 27 does not output a saturated image as a captured image, to an amount, with which the two-dimensional sensor 27 outputs a saturated image, and the glossiness of the sheet P is determined based on the size of an area where pixel values are saturated in the saturated image when the two-dimensional sensor 27 outputs the saturated image.

Figure 10:
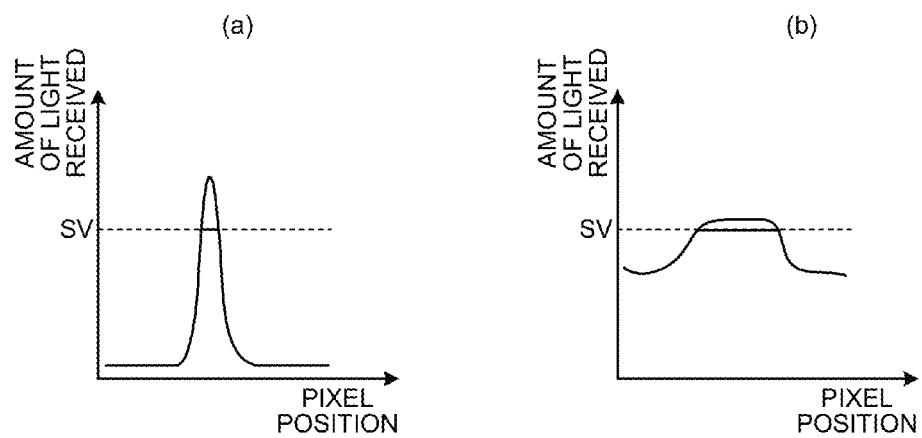
FIG. 10 is a view for explaining a second method of determining the glossiness of a sheet.

FIG. 10 is a view for explaining the second method of determining the glossiness of the sheet P. FIG. 10(a) and FIG. 10(b) illustrate distributions of the amount of light received by the two-dimensional sensor 27 when the amount of light emitted from the glossiness determination light source 32 is increased until the two-dimensional sensor 27 outputs a saturated image. FIG. 10(a) illustrates a case where the sheet P with high glossiness is used as a subject, and FIG. 10(b) illustrates a case where the sheet P with low glossiness is used as a subject. The horizontal axes in the drawings represent pixel positions of the two-dimensional sensor 27, and the vertical axes represent the amounts of light received at the pixel positions. Further, a level of the amount of light received, at which pixel values are saturated (saturation level SV of pixel values), is represented by a dashed line.

If the amount of light emitted from the glossiness determination light source 32 is gradually increased from the reference light emission amount, as illustrated in FIG. 10(a) and FIG. 10(b), the amount of light received in a partial area of the two-dimensional sensor 27 exceeds the saturation level SV of pixel values at a certain stage, and the two-dimensional sensor 27 outputs a saturated image. In this case, if the glossiness of the sheet P serving as a subject is high, as illustrated in FIG. 10(a), the size of an area where the amount of light received exceeds the saturation level SV, that is, the size of an area where pixel values are saturated in the saturated image is relatively small. On the contrary, if the glossiness of the sheet P serving as a subject is small, as illustrated in FIG. 10(b), the size of an area where the amount of light received exceeds the saturation level SV, that is, the size of an area where pixel values are saturated in the saturated image is greater as compared to a case where the glossiness of the sheet P is high. Therefore, it is possible to determine the glossiness of the sheet P based on the size of an area where pixel values are saturated in a saturated image when the two-dimensional sensor 27 outputs the saturated image.

When the glossiness of the sheet P is determined by the second method, the light source drive control unit 46 controls the amount of light emitted from the glossiness determination light source 32 such that the amount of light emitted is gradually increased from the reference light emission amount. The glossiness determining unit 47 sequentially checks captured images output from the two-dimensional sensor 27 while the amount of light emitted from the glossiness determination light source 32 is gradually increased, and when the two-dimensional sensor 27 outputs a saturated image, measures the size of an area where pixel values are saturated in the saturated image. Then, the glossiness determining unit 47 determines the glossiness of the sheet P based on the measured size of the area by, for example, referring to a table containing the size of an area where pixel values are saturated and the glossiness of the sheet P in an associated manner. It is sufficient to, for example, generate the table by experiment in advance, and store the table in the nonvolatile memory 45. Information on the glossiness of the sheet P determined in this manner is sent to the color measurement control unit 116 of the control FPGA 110 mounted on the main control board 120 as described above.

Third Method

A third method is a method, in which the glossiness of the sheet P is determined based on whether the two-dimensional sensor 27 outputs a saturated image when the amount of light emitted from the glossiness determination light source 32 is a predetermined light emission amount, and based on the magnitude of a pixel value of a captured image when the captured image output by the two-dimensional sensor 27 is not a saturated image.

Figure 11:
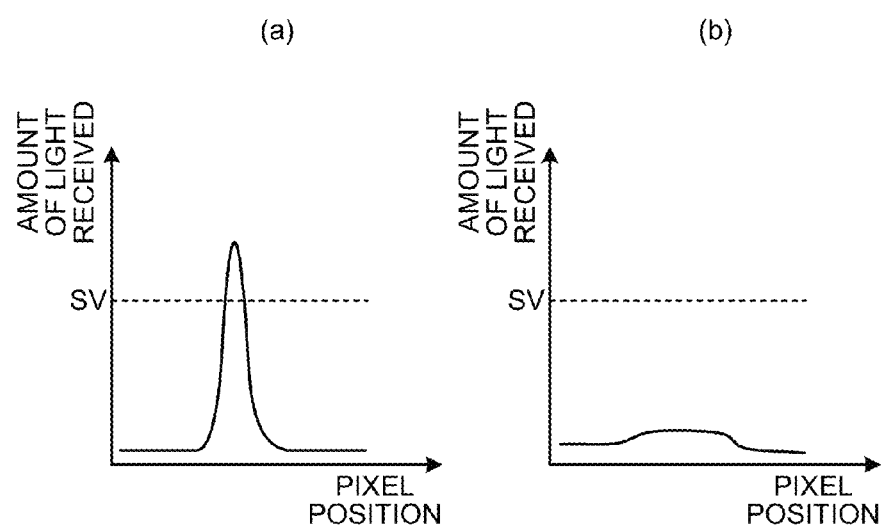
FIG. 11 is a view for explaining a third method of determining the glossiness of a sheet.

FIG. 11 is a view for explaining the third method of determining the glossiness of the sheet P. FIG. 11(a) and FIG. 11(b) illustrate distributions of the amount of light received by the two-dimensional sensor 27 when the glossiness determination light source 32 emits a predetermined amount of light. FIG. 11(a) illustrates a case where the sheet P with high glossiness is used as a subject, and FIG. 11(b) illustrates a case where the sheet P with low glossiness is used as a subject. The horizontal axes in the drawings represent pixel positions of the two-dimensional sensor 27, and the vertical axes represent the amounts of light received at the pixel positions.

Further, a level of the amount of light received, at which pixel values are saturated (saturation level SV of pixel values), is represented by a dashed line.

When the sheet P with high glossiness is employed as a subject, and if the glossiness determination light source 32 emits the predetermined amount of light, as illustrated in FIG. 11(*a*), the amount of light received in a partial area of the two-dimensional sensor 27 exceeds the saturation level SV of pixel values, and the two-dimensional sensor 27 outputs a saturated image. On the contrary, if the sheet P with low glossiness is employed as a subject, and if the amount of light emitted from the glossiness determination light source 32 is the predetermined amount, as illustrated in FIG. 11(*b*), there is no pixel at which the amount of light received exceeds the saturation level SV, and the two-dimensional sensor 27 does not output a saturated image as a captured image. In this case, pixel values of the captured image output by the two-dimensional sensor 27 are reduced with a decrease in the glossiness of the sheet P. Therefore, it is possible to determine whether or not the glossiness of the sheet P is high based on whether or not the two-dimensional sensor 27 outputs a saturated image when the amount of light emitted from the glossiness determination light source 32 is the predetermined amount, and, if a captured image output by the two-dimensional sensor 27 is not a saturated image, it is possible to determine the glossiness of the sheet P based on the magnitude of a pixel value of the captured image.

When the glossiness of the sheet P is determined by the third method, the light source drive control unit 46 controls the glossiness determination light source 32 such that the predetermined amount of light is emitted. The glossiness determining unit 47 checks a captured image output from the two-dimensional sensor 27 when the glossiness determination light source 32 emits the predetermined amount of light, and determines whether the captured image is a saturated image. If the captured image output from the two-dimensional sensor 27 is a saturated image, the glossiness determining unit 47 determines that the glossiness of the sheet P is high. On the contrary, if the captured image output from the two-dimensional sensor 27 is not a saturated image, the glossiness determining unit 47 obtains a pixel value of the captured image (may be an average value of the entire area or a predetermined area, or a pixel value at a specific position), and determines the glossiness of the sheet P based on the obtained pixel value by, for example, referring to a table containing the pixel value and the glossiness of the sheet P in an associated manner. It is sufficient to, for example, generate the table by experiment in advance, and store the table in the nonvolatile memory 45. Information on the glossiness of the sheet P determined in this manner is sent to the color measurement control unit 116 of the control FPGA 110 mounted on the main control board 120 as described above.

The color measuring camera 20 of the present embodiment can determine the glossiness of the sheet P that is captured as a subject under illumination by the glossiness determination light source 32 by using the two-dimensional sensor 27 as described above. Further, it is possible to set a wait time to start color measurement on the color measurement target patches CP based on the determined glossiness of the sheet P.

Color shades of the color measurement target patches CP change before and after ink dries. Therefore, it is necessary to perform the color measurement on the color measurement target patches CP after the ink dries. A drying time of ink adhering to the sheet P differs depending on a sheet type of the sheet P, and the sheet type of the sheet P can be estimated based on the glossiness of the sheet P. Therefore, if the glossiness of the sheet P on which the color measurement target patches CP are formed is obtained, it becomes possible to estimate the drying time of ink depending on the sheet type of the sheet P, so that it becomes possible to appropriately set the wait time to start the color measurement on the color measurement target patches CP.

Incidentally, while the information on the glossiness of the sheet P is used to set the wait time in the present embodiment, this is not a limitation. It is possible to use the information on the glossiness of the sheet P for various purposes in the image forming apparatus 100. Further, while an image of a blank area of the sheet P is captured as a subject and the glossiness of the sheet P is determined by using a saturated image output from the two-dimensional sensor 27 in the present embodiment, if, for example, an image of an area where the color measurement target patches CP are formed on the sheet P is captured as a subject, it is possible to determine the glossiness of the area where the color measurement target patches CP are formed. Further, if an image of a subject other than the sheet P is captured as a subject, it is possible to determine the glossiness of the subject other than the sheet P.

Figure 12:
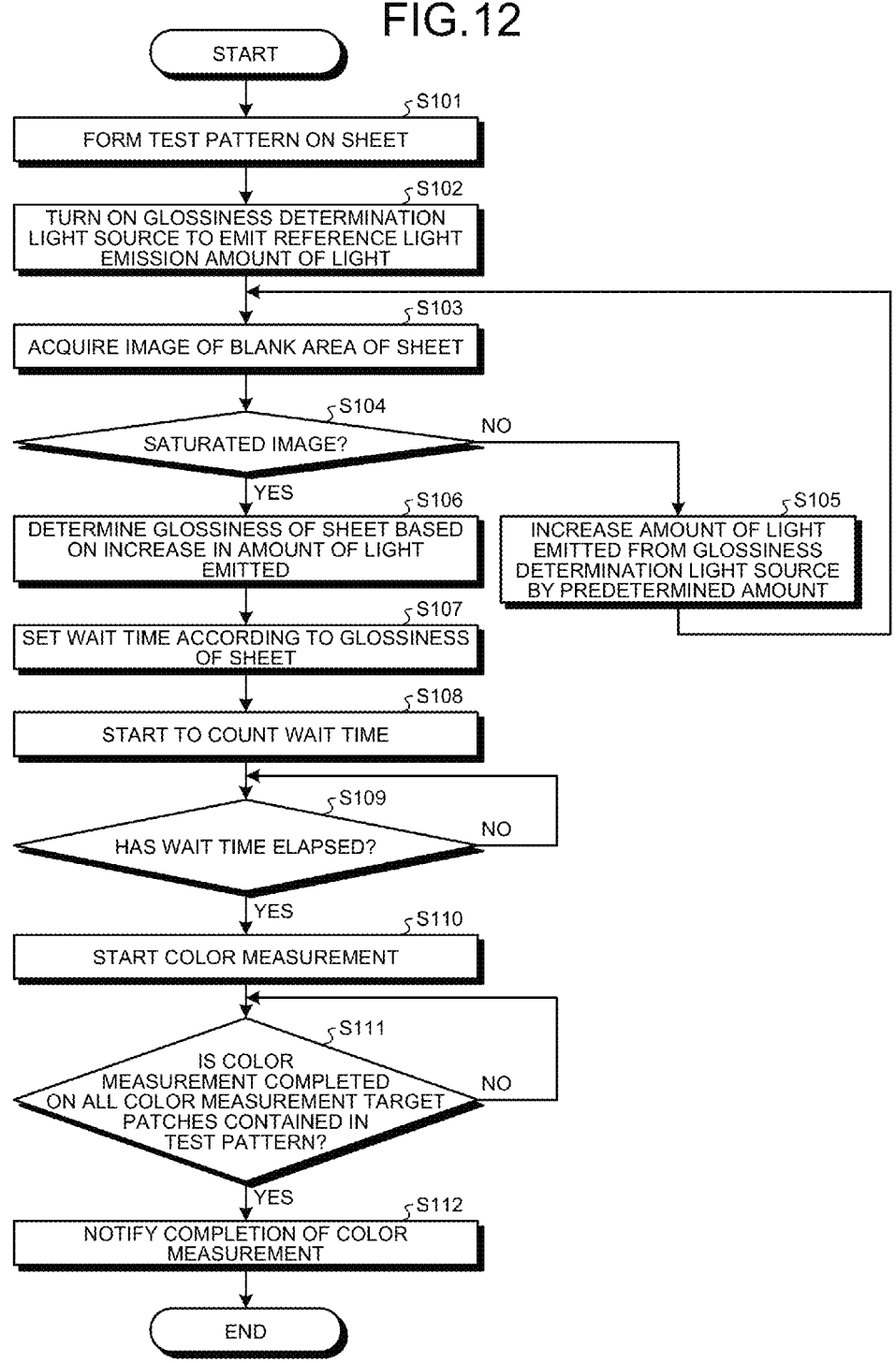
FIG. 12 is a flowchart illustrating the flow of a process performed when the image forming apparatus performs color measurement on color measurement target patches.

Next, with reference to FIG. 12, an example of the flow of a process when color measurement is performed on the color measurement target patches CP will be described. FIG. 12 is a flowchart illustrating the flow of the process performed when the image forming apparatus 100 of the present embodiment performs color measurement on the color measurement target patches CP. Incidentally, the flow of the process illustrated in the flowchart in FIG. 12 is an example of a case where the glossiness of the sheet P is determined by the first method as described above.

When the image forming apparatus 100 performs color measurement on the color measurement target patches CP, the sheet P is first set on the platen 16, the recording head 6 on the carriage 5 ejects ink onto the sheet P, and a test pattern containing a number of the color measurement target patches CP is formed on the sheet P (Step S101). When formation of the test pattern is finished, the carriage 5 moves such that the opening 25 of the color measuring camera 20 is located at a position facing a blank area of the sheet P.

Subsequently, the light source drive control unit 46 of the color measuring camera 20 turns on the glossiness determination light source 32 to emit the reference light emission amount of light (lighting) (Step S102). Then, the two-dimensional sensor 27 starts to capture an image of, as a subject, the blank area of the sheet P illuminated by the glossiness determination light source 32, and acquires a captured image (Step S103).

Subsequently, the glossiness determining unit 47 determines whether the captured image output from the two-dimensional sensor 27 is a saturated image (Step S104). If the captured image output from the two-dimensional sensor 27 is not a saturated image (Step S104: No), the light source drive control unit 46 increases the amount of light emitted from the glossiness determination light source 32 by a predetermined amount (Step S105), and the process returns to Step S103, at which acquisition of the captured image is repeated. On the contrary, if the captured image output from the two-dimensional sensor 27 is a saturated image (Step S104: Yes), the glossiness determining unit 47 obtains an increase in the amount of light emitted from the glossiness determination light source 32, and determines the glossiness of the sheet P based on the increase in the amount of light emitted (Step S106).

Subsequently, the color measurement control unit 116 of the image forming apparatus 100 sets a wait time to start the color measurement on the color measurement target patches CP according to the glossiness of the sheet P determined by the glossiness determining unit 47 (Step S107), and starts to count the wait time (Step S108). The color measurement control unit 116 waits until the wait time set at Step S107 has elapsed (Step S109: No), and when the wait time has elapsed (Step S109: Yes), the color measuring camera 20 is caused to start the color measurement on the color measurement target patches CP (Step S110). Incidentally, it may be possible to display a remaining time of the wait time on the operation panel 17 during the wait. Further, during the wait until the wait time has elapsed, it may be possible to temporarily stop supply of power to each of the units of the image forming apparatus 100 except for the unit that manages the wait time.

Thereafter, the color measurement control unit 116 monitors the color measurement on the color measurement target patches CP performed by the color measuring camera 20, and continually determines whether the color measurement on all of the color measurement target patches contained in the test pattern is finished (Step S111). If the color measurement on all of the color measurement target patches CP contained in the test pattern is finished (Step S111: Yes), completion of the color measurement is notified to a user by, for example, display on the operation panel 17 (Step S112), and a series of the processes is finished.

Method of Measuring Colors of Patches

Next, with reference to FIG. 13 to FIG. 19, a specific example of a method of measuring colors of the color measurement target patches CP will be described in detail. A color measuring method described below includes a pre-process that is performed when the image forming apparatus 100 is in an initial state (when in the initial state due to manufacturing or overhauling), and a color measurement process that is performed when color adjustment is performed on the image forming apparatus 100.

Figure 13:
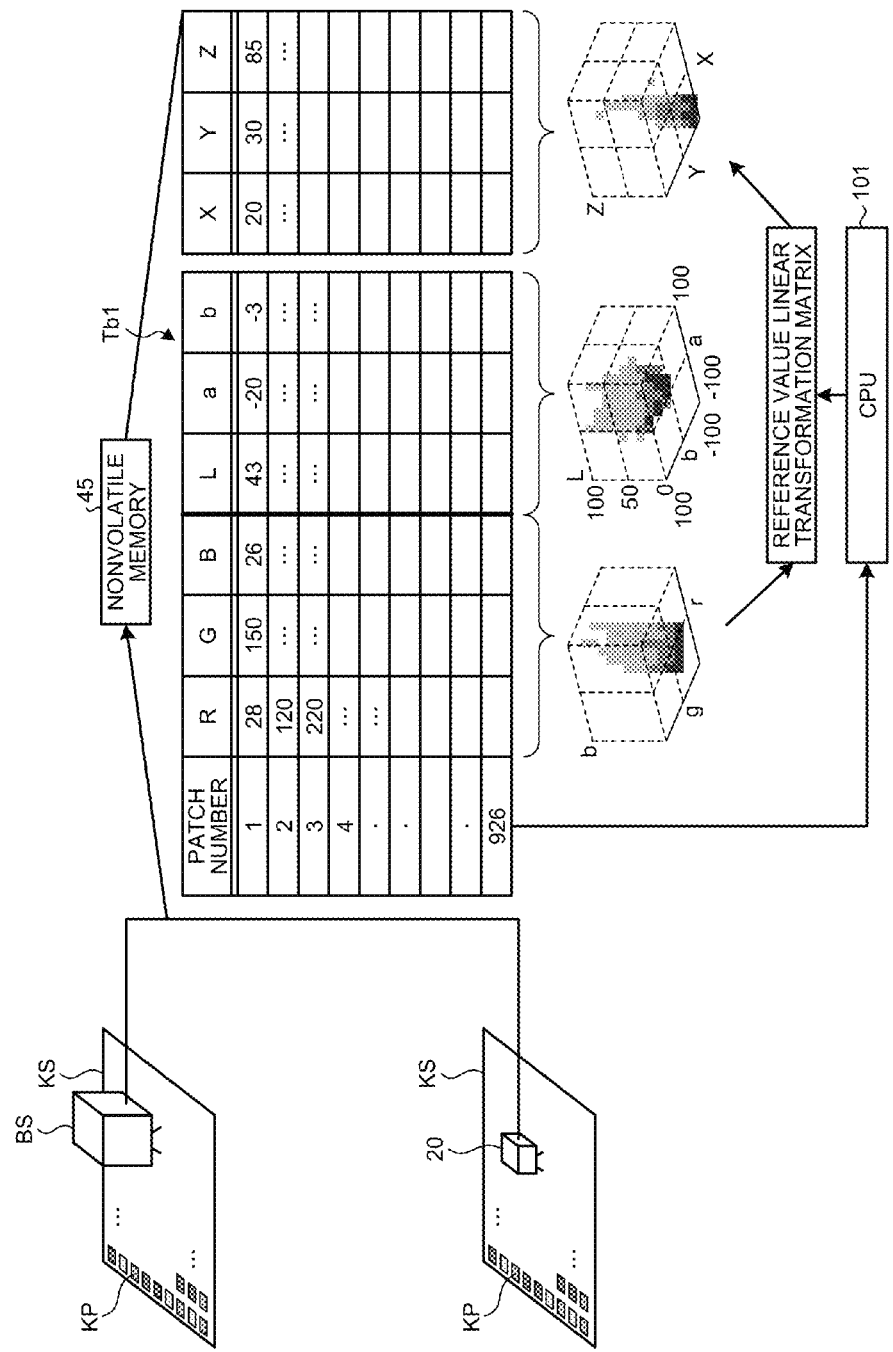
FIG. 13 is a view for explaining a process of acquiring a reference color measurement value and a reference RGB value and a process of generating a reference value linear transformation matrix.

FIG. 13 is a view for explaining a process of acquiring a reference color measurement value and a reference RGB value and a process of generating a reference value linear transformation matrix. The processes illustrated in FIG. 13 are performed as a pre-process. In the pre-process, a reference sheet KS is used, in which an array of multiple reference patches KP is formed. The reference patches KP of the reference sheet KS are the same as the patches of the reference chart 400 provided in the color measuring camera 20.

First, at least one of a Lab value and an XYZ value as a color measurement value of each of the reference patches KP of the reference sheet KS (in the example in FIG. 13, both of the Lab value and the XYZ value) is stored in, for example, a memory table Tb1 provided in the nonvolatile memory 45 or the like of the color measuring camera 20, in association with each of patch numbers. The color measurement values of the reference patches KP are values obtained in advance by color measurement using a spectrometer BS or the like. If the color measurement values of the reference patches KP are already known, it is sufficient to use these values. Hereinafter, the color measurement values of the reference patches KP stored in the memory table Tb1 are referred to as "reference color measurement values".

Subsequently, the reference sheet KS is set on the platen 16 and movement of the carriage 5 is controlled, so that the color measuring camera 20 captures the image of, as a subject, the multiple reference patches KP of the reference sheet KS. Then, RGB values of the reference patches KP obtained by image capturing by the color measuring camera 20 are stored in the memory table Tb1 of the nonvolatile memory 45 in association with the respective patch numbers. That is, the memory table Tb1 stores therein the color measurement values and the RGB values of the respective reference patches KP arrayed on the reference sheet KS, in association with the patch numbers of the respective reference patches KP. Hereinafter, the RGB values of the reference patches KP stored in the memory table Tb1 will be referred to as "reference RGB values". The reference RGB values reflect the characteristics of the color measuring camera 20.

The CPU 101 of the image forming apparatus 100, when the reference color measurement values and the reference RGB values of the reference patches KP are stored in the memory table Tb1 of the nonvolatile memory 45, generates a reference value linear transformation matrix for converting between an XYZ value being a reference color measurement value and a reference RGB value, which form a pair for the same patch number, and stores the reference value linear transformation matrix in the nonvolatile memory 45. If only the Lab values are stored as the reference color measurement values in the memory table Tb1, it is sufficient to convert the Lab values into XYZ values by using a well-known conversion formula for converting Lab values to XYZ values, and thereafter generate the reference value linear transformation matrix.

Figure 14:
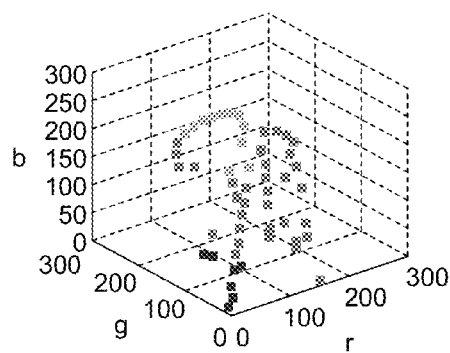
FIG. 14 is a view illustrating an example of initial reference RGB values.

Further, when the color measuring camera 20 captures the image of the multiple reference patches KP of the reference sheet KS, the image of the reference chart 400 provided in the color measuring camera 20 is captured simultaneously. RGB values of the respective patches of the reference chart 400 obtained by the image capturing are also stored in the memory table Tb1 of the nonvolatile memory 45 in association with the respective patch numbers. The RGB values of the respective patches of the reference chart 400 stored in the memory table Tb1 through the pre-process will be referred to as "initial reference RGB values". FIG. 14 is a view illustrating an example of the initial reference RGB values. FIG. 14(*a*) illustrates a state in which the initial reference RGB values (RdGdBd) are stored in the memory table Tb1, and a state in which initial reference Lab values (Ldadbd) obtained by conversion from the initial reference RGB values (RdGdBd) to Lab values and initial reference XYZ values (XdYdZd) obtained by conversion to XYZ values are also stored together with the initial reference RGB values (RdGdBd). Further, FIG. 14(*b*) is a scatter diagram in which the initial reference RGB values of the respective patches of the reference chart 400 are plotted.

After the above described pre-process is finished, the image forming apparatus 100 drives the main-scanning motor 8, the sub-scanning motor 12, and the recording head 6 under the control of the CPU 101 based on image data, print setting, or the like input from outside, and intermittently conveys the sheet P in the sub-scanning direction while moving the carriage 5 in the main-scanning direction and ejecting ink from the recording head 6 to thereby form an image on the sheet P. At this time, the amount of ink ejected from the recording head 6 may change depending on the device-specific characteristics or a temporal change, and if the amount of ink ejected changes, image formation is performed with colors different from colors of an image desired by a user, and therefore, color reproducibility is reduced. Therefore, the image forming apparatus 100 performs a color measurement process of obtaining the color measurement values of the color measurement target patches CP formed on the sheet P at a predetermined timing of performing the color adjustment. Then, a device profile is generated or corrected based on the color measurement values of the color measurement target patches CP obtained through the color measurement process, and the color adjustment is performed based on the device profile so that the color reproducibility of an output image can be improved.

Figure 15:
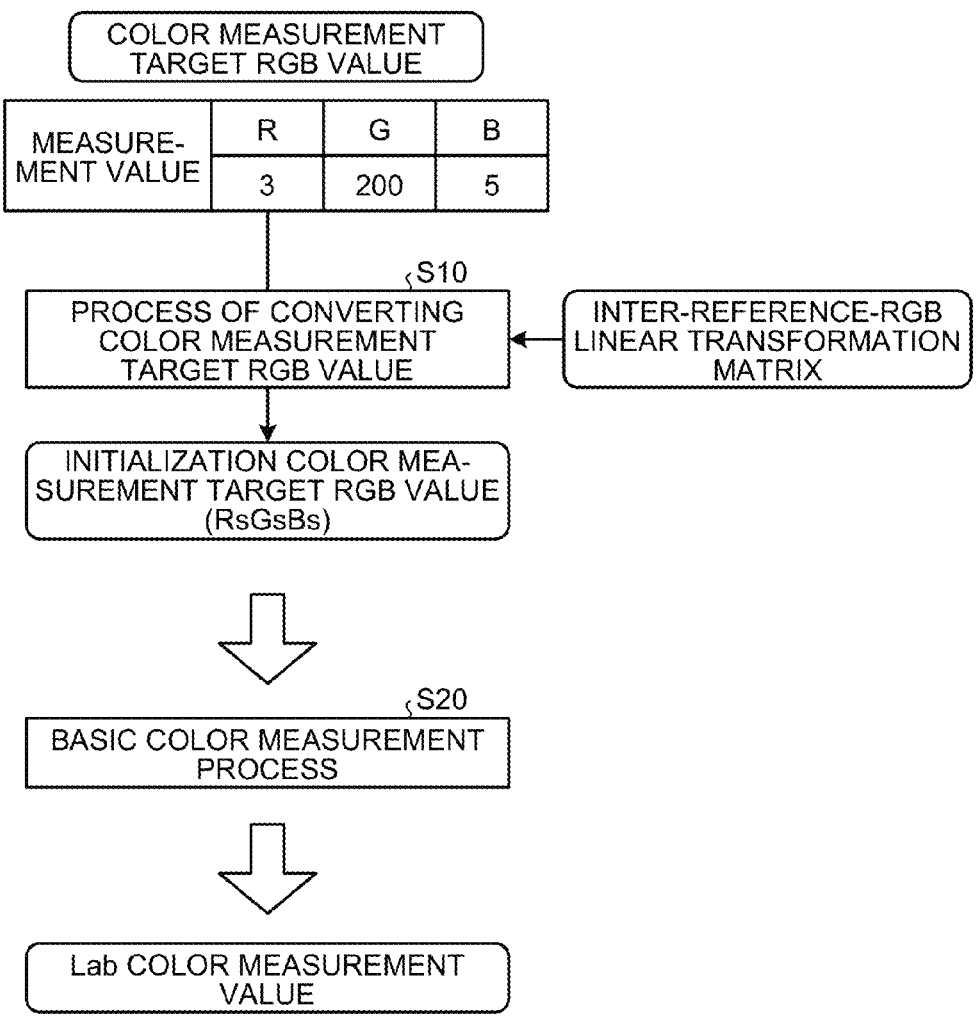
FIG. 15 is a view for explaining an outline of a color measurement process.

FIG. 15 is a view for explaining an outline of the color measurement process. The image forming apparatus 100, when performing the color adjustment, first ejects ink from the recording head 6 onto the sheet P set on the platen 16 and forms a test pattern in which a number of the color measurement target patches CP are arrayed. Hereinafter, the sheet P on which the test pattern is formed will be referred to as an "adjustment sheet CS". On the adjustment sheet CS, the color measurement target patches CP that reflect the output characteristics of the image forming apparatus 100 at the time of adjustment, in particular, the output characteristics of the recording head 6 are formed. Meanwhile, image data for forming the test pattern is stored in the nonvolatile memory 45 or the like in advance.

Subsequently, as illustrated in FIG. 15, in the state in which the adjustment sheet CS is set on the platen 16 or the adjustment sheet CS is generated and maintained on the platen 16 without being ejected, the image forming apparatus 100 captures images by using the two-dimensional sensor 27 of the color measuring camera 20 while moving the carriage 5 in the main-scanning direction on the adjustment sheet CS. Then, the averaging processing unit 43 performs a process on the captured images output from the two-dimensional sensor 27, so that the RGB values of the color measurement target patches CP are obtained. The two-dimensional sensor 27 also captures the image of the reference chart 400 at the same time of capturing the image of the color measurement target patches CP being targets of the color measurement, so that the RGB values of the respective patches contained in the reference chart 400 are also obtained. Hereinafter, the RGB values of the color measurement target patches CP being targets of the color measurement will be referred to as "color measurement target RGB values", and the RGB values of the respective patches of the reference chart 400 will be referred to as "color measurement reference RGB values (RdsGdsBds)". The "color measurement reference RGB values (RdsGdsBds)" are stored in the nonvolatile memory 45 or the like.

The color measurement arithmetic unit 44 of the color measuring camera 20 performs a process of converting the color measurement target RGB values to initialization color measurement target RGB values (RsGsBs) by using an inter-reference-RGB linear transformation matrix to be described later (Step S10). The initialization color measurement target RGB values (RsGsBs) are obtained by eliminating, from the color measurement target RGB values, the influence of a temporal change in the image capturing conditions of the color measuring camera 20, which occurs in a period from the initial state in which the pre-process is performed until the time of adjustment at which the color measurement process is performed, for example, the influence of a temporal change in the color measurement light source 31 or a temporal change in the two-dimensional sensor 27.

Thereafter, the color measurement arithmetic unit 44 performs a basic color measurement process to be described later on the initialization color measurement target RGB values (RsGsBs) converted from the color measurement target RGB values (Step S20), and acquires Lab values that are the color measurement values of the color measurement target patches CP being targets of the color measurement.

Figure 16:
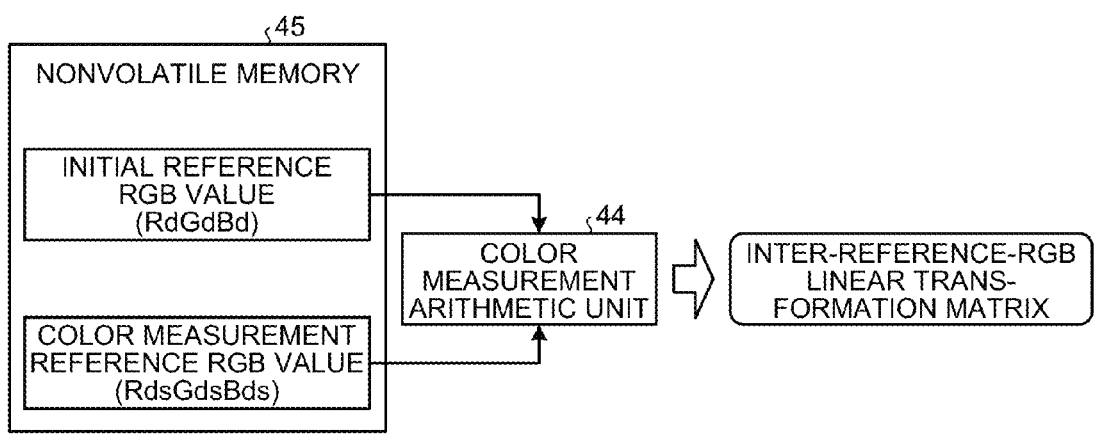
FIG. 16 is a view for explaining a process of generating an inter-reference-RGB linear transformation matrix.
Figure 17:
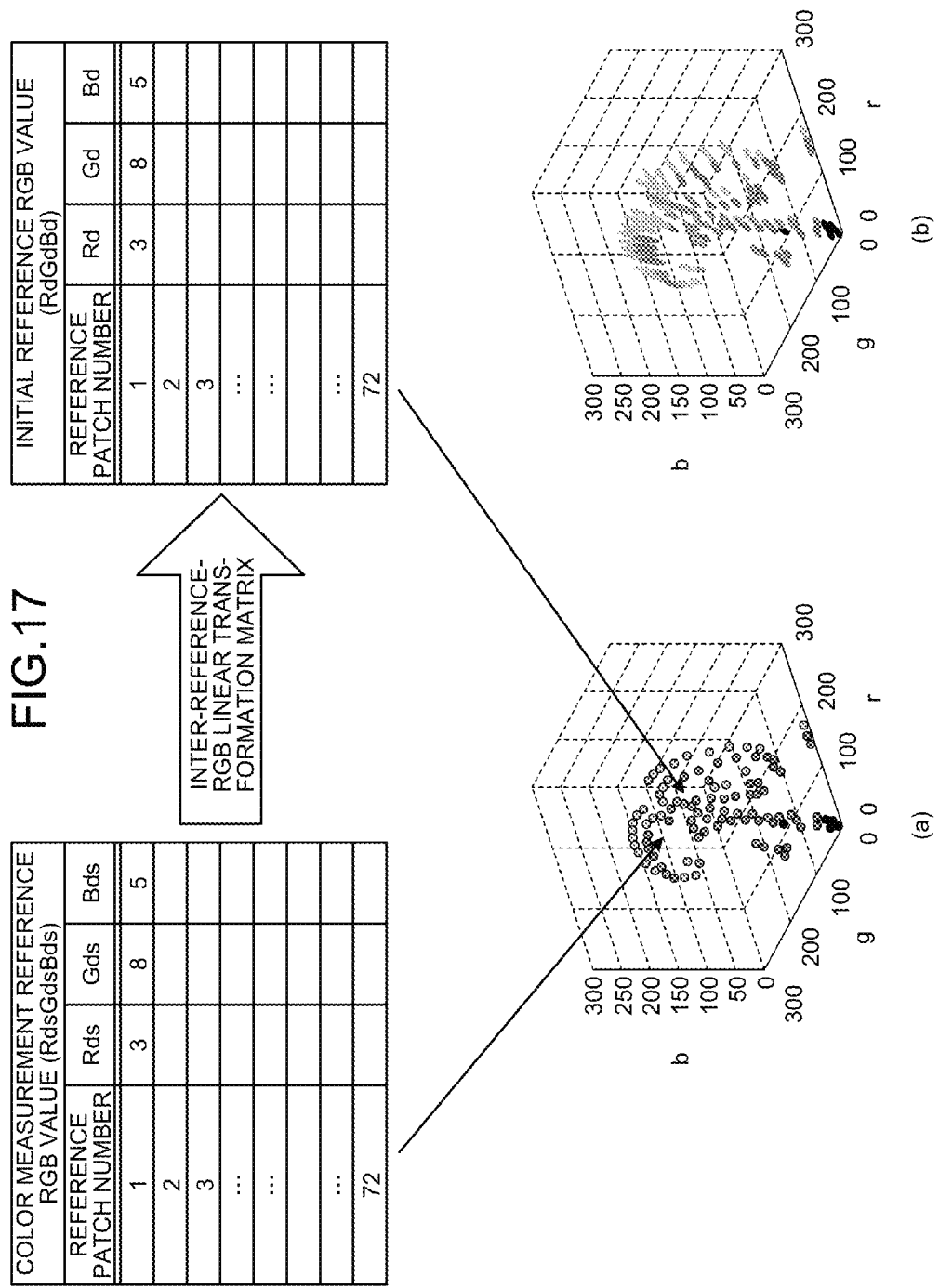
FIG. 17 is a view illustrating a relation between the initial reference RGB values and color measurement reference RGB values.

FIG. 16 is a view for explaining a process of generating the inter-reference-RGB linear transformation matrix, and FIG. 17 is a view illustrating a relation between the initial reference RGB values and the color measurement reference RGB values. The color measurement arithmetic unit 44, before performing the process of converting the color measurement target RGB values to the initialization color measurement target RGB values (RsGsBs) (Step S10), generates the inter-reference-RGB linear transformation matrix used for this conversion. Specifically, as illustrated in FIG. 16, the color measurement arithmetic unit 44 reads, from the nonvolatile memory 45, the initial reference RGB values (RdGdBd) obtained through the pre-process while the image forming apparatus 100 is in the initial state, and the color measurement reference RGB values (RdsGdsBds) obtained at the time of adjustment, and generates the inter-reference-RGB linear transformation matrix for converting the color measurement reference RGB values (RdsGdsBds) to the initial reference RGB values (RdGdBd). Then, the color measurement arithmetic unit 44 stores the generated inter-reference-RGB linear transformation matrix in the nonvolatile memory 45.

In FIG. 17, gray points in FIG. 17(a) are plot points of the initial reference RGB values RdGdBd in the rgb space, and black points are plot points of the color measurement reference RGB values RdsGdsBds in the rgb space. As can be seen from FIG. 17(a), the values of the color measurement reference RGB values RdsGdsBds change from the values of the initial reference RGB values RdGdBd, and directions of the change in the rgb space are approximately the same with one another as illustrated in FIG. 17(b), but the directions of deviation differ depending of hue. In this manner, a cause of a change in the RGB values when the image of the patches of the same reference chart 400 is captured includes a temporal change in the color measurement light source 31, a temporal change in the two-dimensional sensor 27, and the like.

As described above, if the color measurement values are obtained by using the color measurement target RGB values that are obtained by capturing the image of the color measurement target patches CP in the state in which the RGB values obtained by image capturing by the color measuring camera 20 have changed, errors may occur in the color measurement values by the amount of the change. Therefore, the inter-reference-RGB linear transformation matrix for converting the color measurement reference RGB values RdsGdsBds to the initial reference RGB values RdGdBd is obtained by using an estimation method, such as a least squares method, between the initial reference RGB values RdGdBd and the color measurement reference RGB values RdsGdsBd. Then, the color measurement target RGB values obtained by capturing the images of the color measurement target patches CP by the color measuring camera 20 are converted to the initialization color measurement target RGB values RsGsBs by using the inter-reference-RGB linear transformation matrix, and the basic color measurement process to be described later is performed on the initialization color measurement target RGB values RsGsBs obtained by the conversion, so that the color measurement values of the color measurement target patches CP can be acquired with high accuracy.

The inter-reference-RGB linear transformation matrix may be a higher-order non-linear matrix, instead of a first-order matrix. If the non-linearity between the rgb space and the XYZ space is high, it becomes possible to improve the accuracy of conversion by using a higher-order matrix.

The color measurement arithmetic unit 44 converts the color measurement target RGB values obtained by capturing the image of the color measurement target patches CP to the initialization color measurement target RGB values (RsGsBs) by using the inter-reference-RGB linear transformation matrix as described above (Step S10), and thereafter performs the basic color measurement process on the initialization color measurement target RGB values (RsGsBs) at Step S20.

Figure 18:
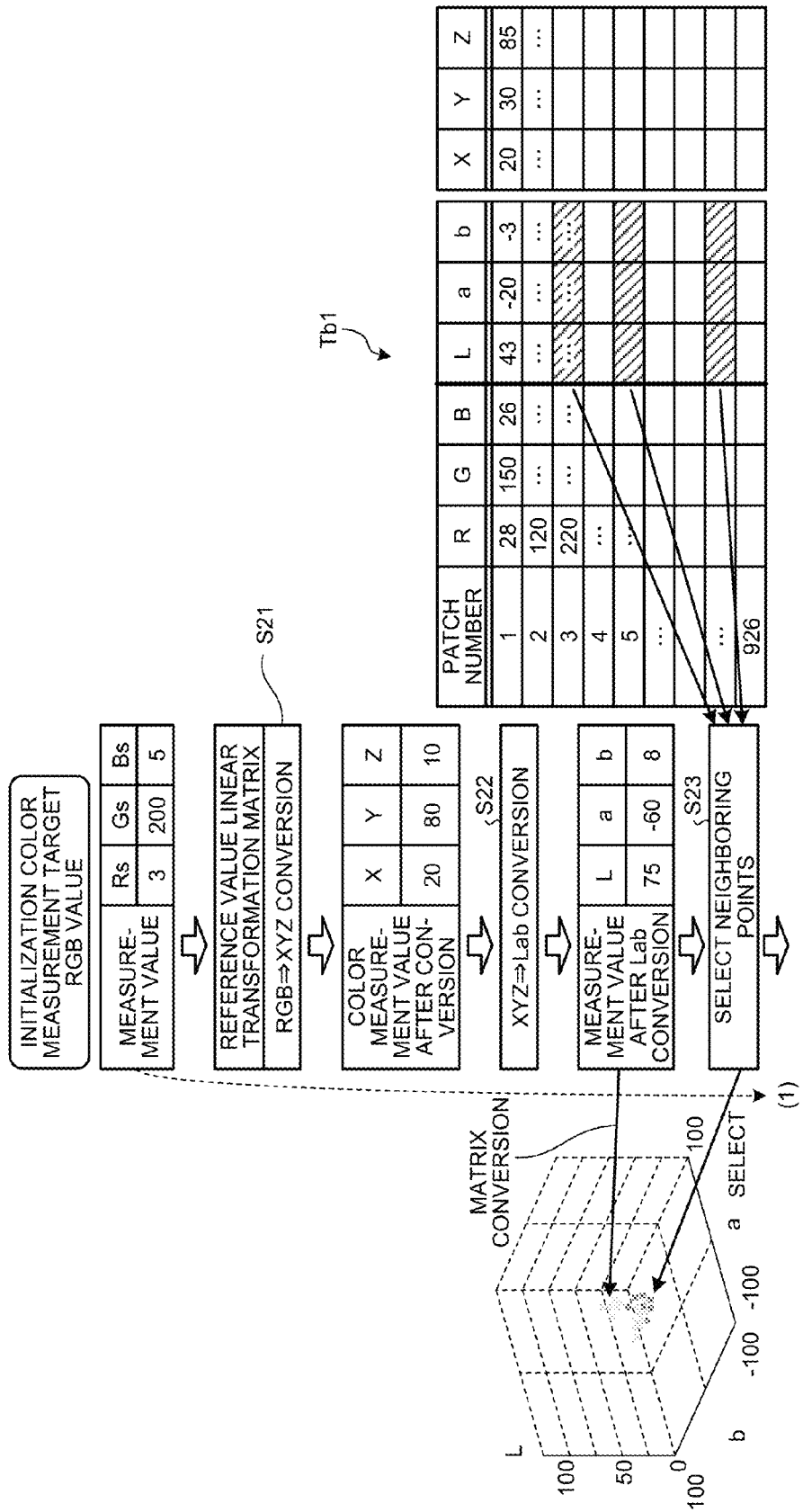
FIG. 18 is a view for explaining a basic color measurement process.
Figure 19:
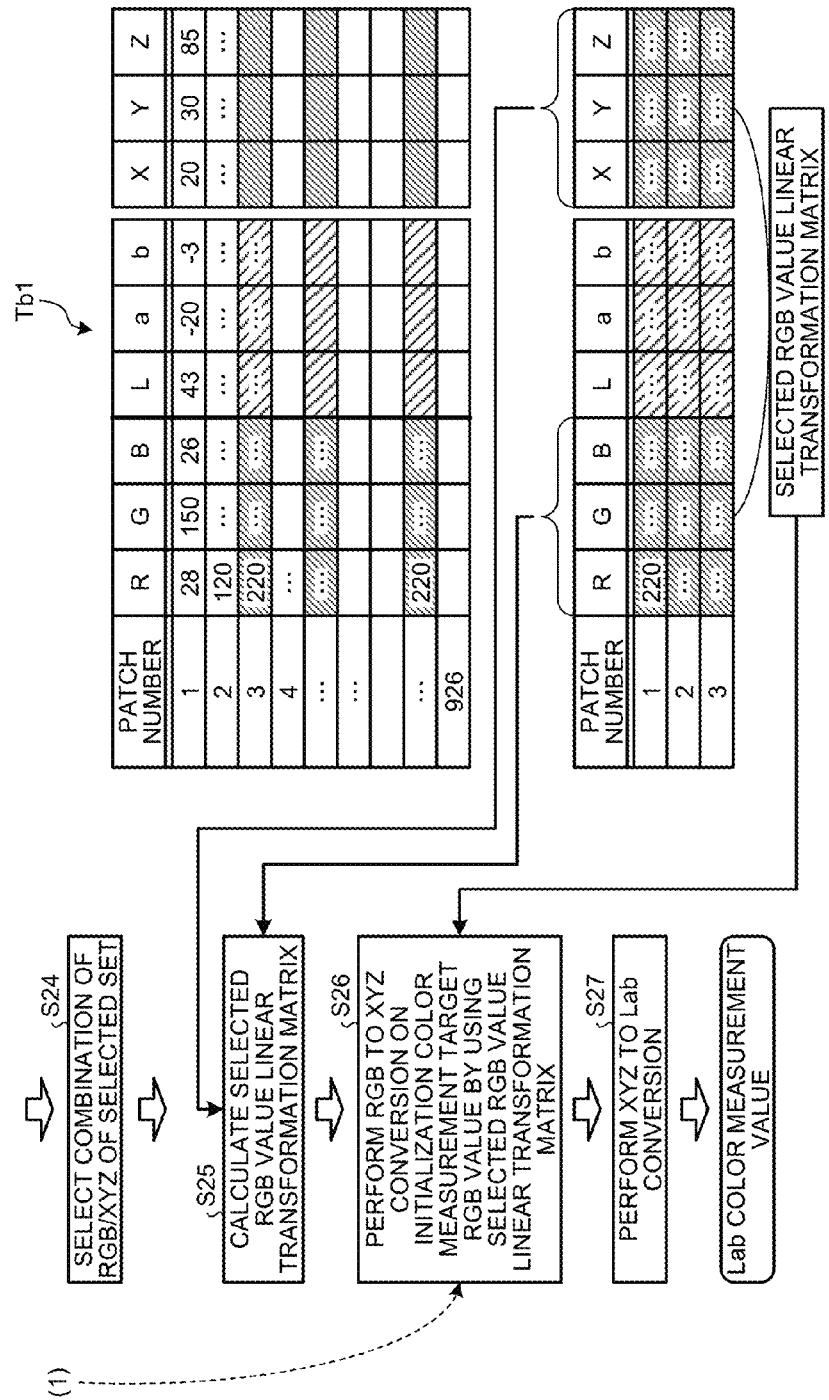
FIG. 19 is a view for explaining the basic color measurement process.

FIG. 18 and FIG. 19 are views for explaining the basic color measurement process. The color measurement arithmetic unit 44 first reads the reference value linear transformation matrix, which is generated and stored in the nonvolatile memory 45 through the pre-process, converts an initialization color measurement target RGB values (RsGsBs) to a first XYZ value by using the reference value linear transformation matrix, and stores the value in the nonvolatile memory 45 (Step S21). In FIG. 18, an example is illustrated in which an initialization color measurement target RGB value (3, 200, and 5) is converted to a first XYZ value (20, 80, and 10) by using the reference value linear transformation matrix.

Subsequently, the color measurement arithmetic unit 44 converts the first XYZ value that has been converted from the initialization color measurement target RGB value (RsGsBs) at Step S21 to a first Lab value by using a well-known conversion formula, and stores the value in the nonvolatile memory 45 (Step S22). In FIG. 18, an example is illustrated in which the first XYZ value (20, 80, and 10) is converted to a first Lab value (75, −60, and 8) by using a well-known conversion formula.

Subsequently, the color measurement arithmetic unit 44 searches through the multiple reference color measurement values (Lab values) that are stored in the memory table Tb1 of the nonvolatile memory 45 through the pre-process, and selects a set of multiple patches (neighboring color patches) having the reference color measurement values (Lab values) at distances close to the first Lab value in the Lab space among the reference color measurement values (Lab values) (Step S23). As a method of selecting the patches at close distances, for example, it is possible to employ a method of calculating distances from all of the reference color measurement values (Lab values) stored in the memory table Tb1 to the first Lab value, and selecting multiple patches having Lab values (in FIG. 18, Lab values with hatching) at close distances to the first Lab value.

Subsequently, as illustrated in FIG. 19, the color measurement arithmetic unit 44 extracts RGB values (reference RGB values) and XYZ values associated with the Lab values for the respective neighboring color patches selected at Step S23 by referring to the memory table Tb1, and selects a combination of an RGB value and an XYZ value from among the multiple RGB values and XYZ values (Step S24). Then, the color measurement arithmetic unit 44 obtains, by using the least squares method or the like, a selected RGB value linear transformation matrix for converting the RGB value to the XYZ value in the selected combination (selected set), and stores the obtained selected RGB value linear transformation matrix in the nonvolatile memory 45 (Step S25).

Subsequently, the color measurement arithmetic unit 44 converts the initialization color measurement target RGB value (RsGsBs) to a second XYZ value by using the selected RGB value linear transformation matrix generated at Step S25 (Step S26). Further, the color measurement arithmetic unit 44 converts the second XYZ value obtained at Step S26 to a second Lab value by using a well-known conversion formula (Step S27), and employs the obtained second Lab value as a final color measurement value of each of the color measurement target patches CP. The image forming apparatus 100 generates or corrects the device profile based on the color measurement values obtained by the color measurement process as described above, and performs color adjustment based on the device profile, so that the color reproducibility of an output image can be improved.

Incidentally, the above described color measuring camera 20 is provided with the reference chart 400 on the housing 23 and configured to simultaneously capture the images of the color measurement target patches CP and the reference chart 400 by the two-dimensional sensor 27 of the sensor unit 26. However, as described above, the initial reference RGB values and the color measurement reference RGB values obtained by capturing the image of the reference chart 400 are used to eliminate the influence of a temporal change in the image capturing conditions of the color measuring camera 20, such as a temporal change in the color measurement light source 31 or a temporal change in the two-dimensional sensor 27, from the color measurement target RGB values obtained by capturing the image of the color measurement target patches CP. That is, the initial reference RGB values and the color measurement reference RGB values obtained by capturing the image of the reference chart 400 are used to calculate the above described inter-reference-RGB linear transformation matrix and to convert the color measurement target RGB values to the initialization color measurement target RGB values (RsGsBs) by using the inter-reference-RGB linear transformation matrix.

Therefore, if the level of a temporal change in the image capturing conditions of the color measuring camera 20 is low enough to be ignored with respect to the accuracy needed for color measurement, it may be possible to calculate the color measurement values of the color measurement target patches CP by using the color measuring camera 20 in which the reference chart 400 is omitted. In this case, the process of converting the color measurement target RGB values to the initialization color measurement target RGB values (Step S10 in FIG. 15) is omitted, and the basic color measurement process (Step S20 in FIG. 15, FIG. 18, and FIG. 19) is performed on the color measurement target RGB values.

Modifications of Color Measuring Camera

Next, modifications (a first modification and a second modification) of the color measuring camera 20 of the present embodiment will be described. Hereinafter, the color measuring camera 20 of the first modification is described as a color measuring camera 20A, and the color measuring camera 20 of the second modification is described as a color measuring camera 20B. In each of the modifications, the same components as those of the above described color measuring camera 20 are denoted by the same reference signs, and the same explanation will be omitted.

First Modification

Figure 20A:
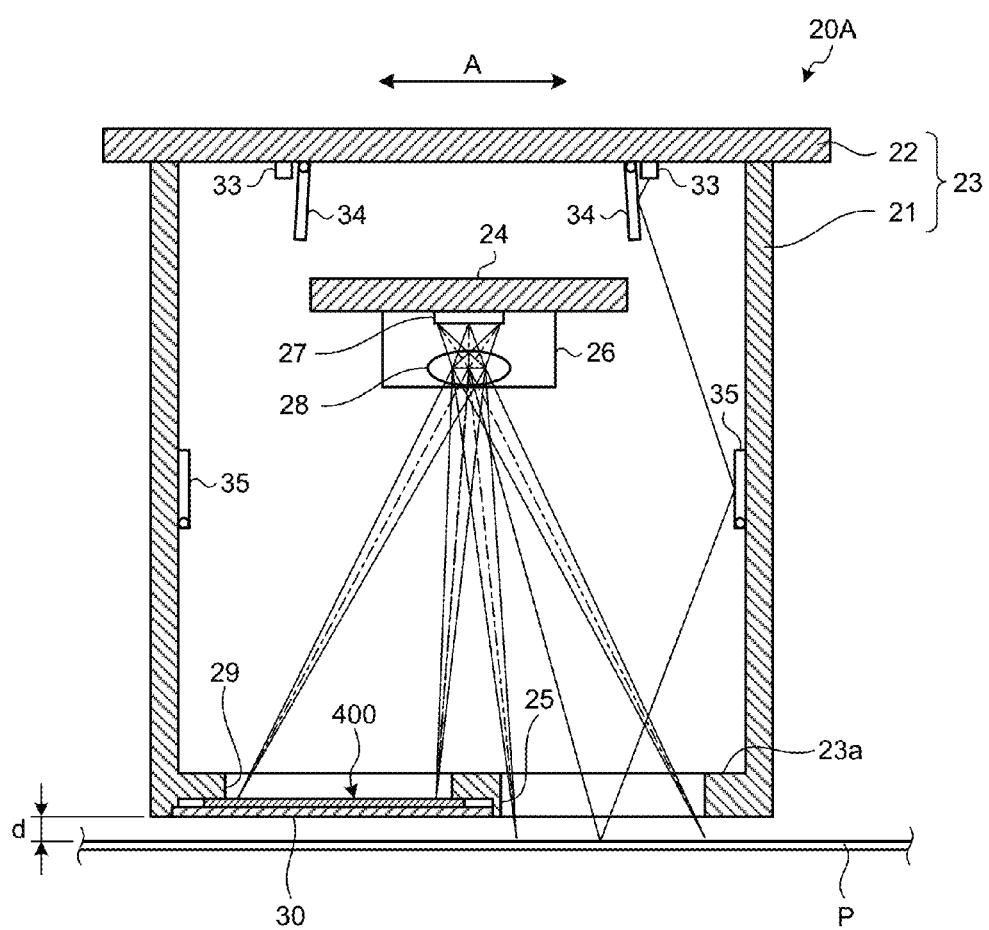
FIG. 20A is a vertical cross-sectional view of a color measuring camera according to a first modification.
Figure 20B:
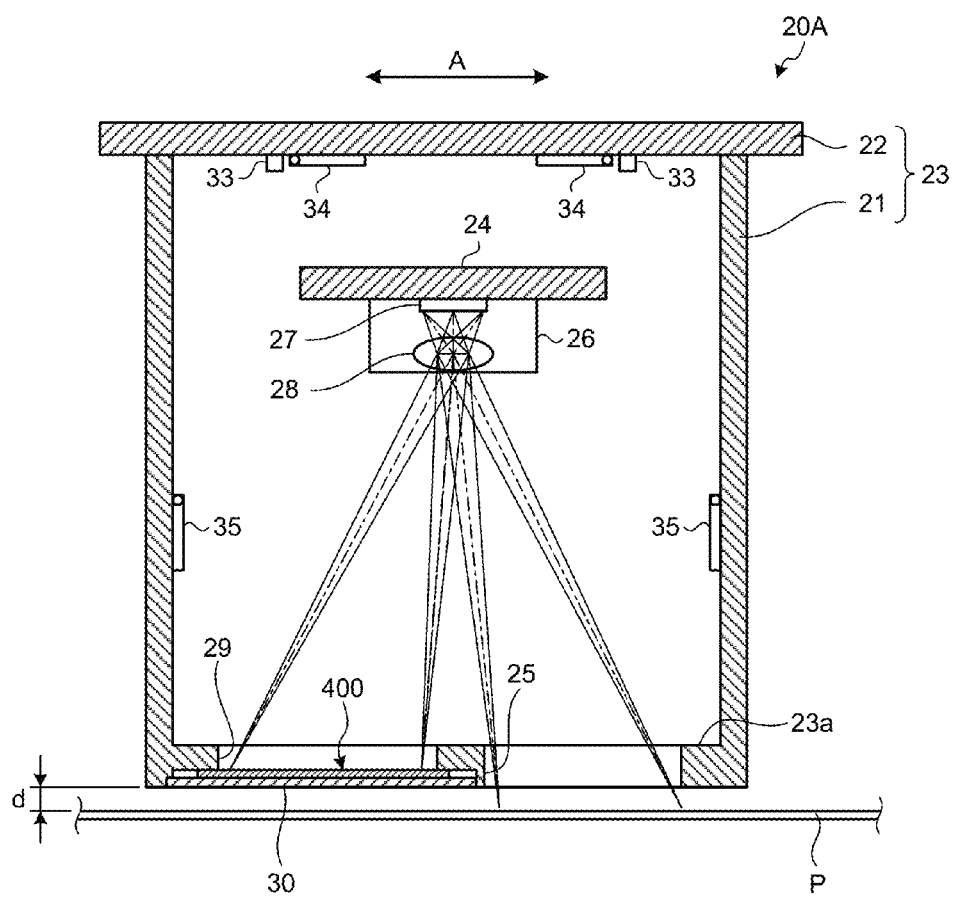
FIG. 20B is a vertical cross-sectional view of the color measuring camera according to the first modification.

FIG. 20A and FIG. 20B are vertical cross-sectional views of the color measuring camera 20A of the first modification. The color measuring camera 20A of the first modification includes common light sources 33, instead of the color measurement light source 31 and the glossiness determination light sources 32 of the above described color measuring camera 20. The common light sources 33 are light sources used both when the color measurement is performed on the color measurement target patches CP and when the glossiness of the sheet P is determined. Further, in the color measuring camera 20A of the first modification, first optical path changing mirrors 34 and second optical path changing mirrors 35 are provided to change the optical paths of the common light sources 33 between when the color measurement is performed on the color measurement target patches CP and when the glossiness of the sheet P is determined. The common light sources 33 are arranged at positions such that, when the first optical path changing mirrors 34 and the second optical path changing mirrors 35 do not reflect light from the light sources, specular reflection light of a subject does not enter the two-dimensional sensor 27 of the sensor unit 26.

Each of the first optical path changing mirrors 34 and the second optical path changing mirrors 35 is configured to be rotatable about a rotary shaft serving as a fulcrum, and one surface is a mirror surface that reflects light. The first optical path changing mirrors 34 are mounted on, for example, the board 22 forming an upper surface part of the housing 23, and the second optical path changing mirrors 35 are mounted on, for example, the frame 21 forming side surface parts of the housing 23. The second optical path changing mirrors 35 mounted on the side surface parts of the housing 23 are formed such that surfaces opposite to the mirror surfaces are colored in black that absorbs light.

In the color measuring camera 20A of the first modification, when the glossiness of the sheet P is determined, the first optical path changing mirrors 34 and the second optical path changing mirrors 35 are rotated by using the respective rotary shafts as fulcrums, and located at positions as illustrated FIG. 20A. In this case, surfaces of the first optical path changing mirrors 34 and the second optical path changing mirrors 35 facing the common light sources 33 are the mirror surfaces. Therefore, light from the common light sources 33 are sequentially reflected by the first optical path changing mirrors 34 and the second optical path changing mirrors 35, and irradiates the sheet P in the subject area via the opening 25. Then, reflected light containing a specular reflection component of the sheet P illuminated by the common light sources 33 enters the two-dimensional sensor 27 of the sensor unit 26. That is, the common light sources 33 can function as the above described glossiness determination light sources 32 by locating the first optical path changing mirrors 34 and the second optical path changing mirrors 35 at the positions as illustrated in FIG. 20A.

On the contrary, when the color measurement is performed on the color measurement target patches CP, the first optical path changing mirrors 34 and the second optical path changing mirrors 35 are rotated by using the respective rotary shafts as fulcrums, and located at positions as illustrated in FIG. 20B. Accordingly, the first optical path changing mirrors 34 are deviated from the optical paths of the common light sources 33, and the second optical path changing mirrors 35 are located such that the mirror surfaces are hidden and the black surfaces face the common light sources 33. Therefore, light from the common light sources 33 uniformly irradiate the image capturing target area without being reflected by the first optical path changing mirrors 34 and the second optical path changing mirrors 35. That is, the common light sources 33 can function as the above described color measurement light source 31 by locating the first optical path changing mirrors 34 and the second optical path changing mirrors 35 at the positions as illustrated in FIG. 20B.

Incidentally, in the configuration example of the color measuring camera 20A of the first modification illustrated in FIG. 20A and FIG. 20B, the common light sources 33, the first optical path changing mirrors 34, and the second optical path changing mirrors 35 are provided not only on the opening 25 side inside the housing 23, but also on the reference chart 400 side. Therefore, it is possible to determine the glossiness of the reference chart 400 by the same method as applied for the glossiness of the sheet P. Further, in this configuration, it may be possible to integrate the two first optical path changing mirrors 34, and incline the first optical path changing mirror 34 to one of the two common light sources 33 side to be used.

Second Modification

Figure 21:
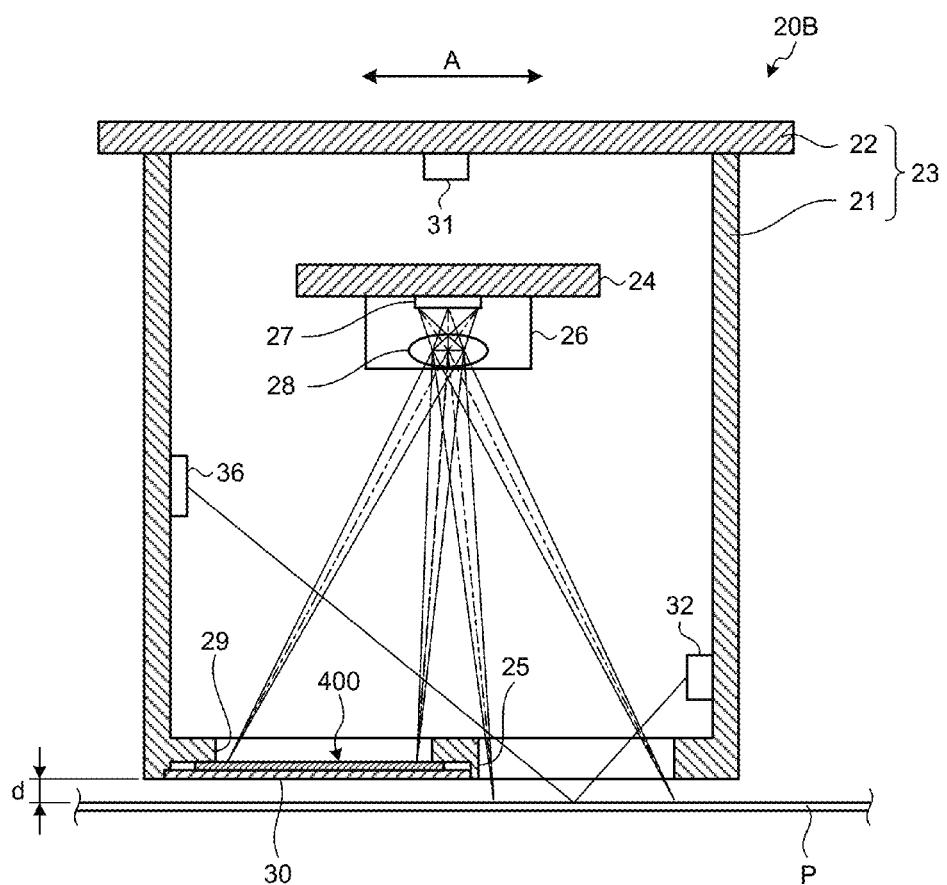
FIG. 21 is a vertical cross-sectional view of a color measuring camera according to a second modification.

FIG. 21 is a vertical cross-sectional view of the color measuring camera 20B of the second modification. The color measuring camera 20B of the second modification includes a dedicated sensor unit 36 used to determine the glossiness of the sheet P, in addition to the sensor unit 26. The glossiness determination light source 32 is arranged at a position such that specular reflection light (a specular reflection component of reflected light) specularly reflected from the subject area upon emission of light from the light source enters the dedicated sensor unit 36. In the color measuring camera 20B of the second modification, it is possible to relatively freely layout the glossiness determination light source 32 and the dedicated sensor unit 36.

Incidentally, even in the color measuring camera 20B of the second modification, if another set of the glossiness determination light source 32 and the dedicated sensor unit 36 is provided for the reference chart 400, it becomes possible to determine the glossiness of the reference chart 400.

Modification of Glossiness Determination

Next, a modification of the process of determining the glossiness of the sheet P will be described. In the present modification, for example, a glossiness reference area containing multiple glossiness patterns different in glossiness is provided on the reference chart 400 arranged inside the housing 23 of the color measuring camera 20. Further, as described above, the two-dimensional sensor 27 captures the image of the sheet P illuminated by the glossiness determination light source 32 arranged on the opening 25 side and the glossiness reference area illuminated by the glossiness determination light source 32 arranged on the reference chart 400 side. The glossiness determining unit 47 extracts a saturated image of the sheet P and an image of the glossiness reference area from an image output by the two-dimensional sensor 27, and determines the glossiness of the sheet P by comparing the extracted images.

Figure 22:
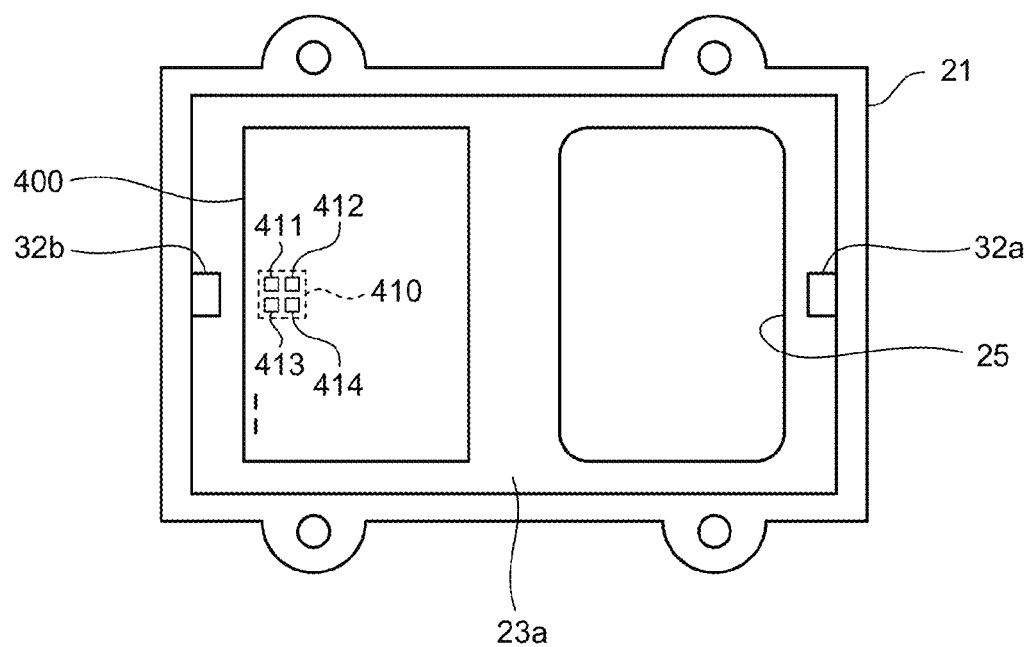
FIG. 22 is a plan view of the bottom surface of the housing of the color measuring camera, when viewed in the same direction as in FIG. 4B.

FIG. 22 is a plan view of the bottom surface 23a of the color measuring camera 20 used in the present modification, when viewed from the same position as in FIG. 4B. As illustrated in FIG. 22, the color measuring camera 20 includes the glossiness determination light sources 32 on both of the opening 25 side and the reference chart 400 side. Hereinafter, the glossiness determination light source 32 provided on the opening 25 side is referred to as a first light source 32a and the glossiness determination light source 32 arranged on the reference chart 400 side is referred to as a second light source 32b.

The reference chart 400 includes a glossiness reference area 410, in addition to the reference patch arrays 401 to 404, the distance measurement line 405, the dot diameter measurement pattern array 406, and the chart position specification markers 407 as described above. In FIG. 22, illustration of the reference patch arrays 401 to 404 and the like are omitted.

The glossiness reference area 410 contains multiple glossiness patterns 411 to 414 (four glossiness patterns in the example in FIG. 22) different in glossiness. The glossiness of the glossiness patterns 411 to 414 correspond to respective multiple sheet types of the sheet P. That is, each of the glossiness patterns 411 to 414 has the same glossiness as one of the sheet types of the sheet P different in glossiness. The glossiness reference area 410 containing the glossiness patterns 411 to 414 is arranged at a specular reflection position of the second light source 32b on the reference chart 400, that is, positioned such that light from the second light source 32b is incident on the two-dimensional sensor 27 by being specularly reflected.

Figure 23:
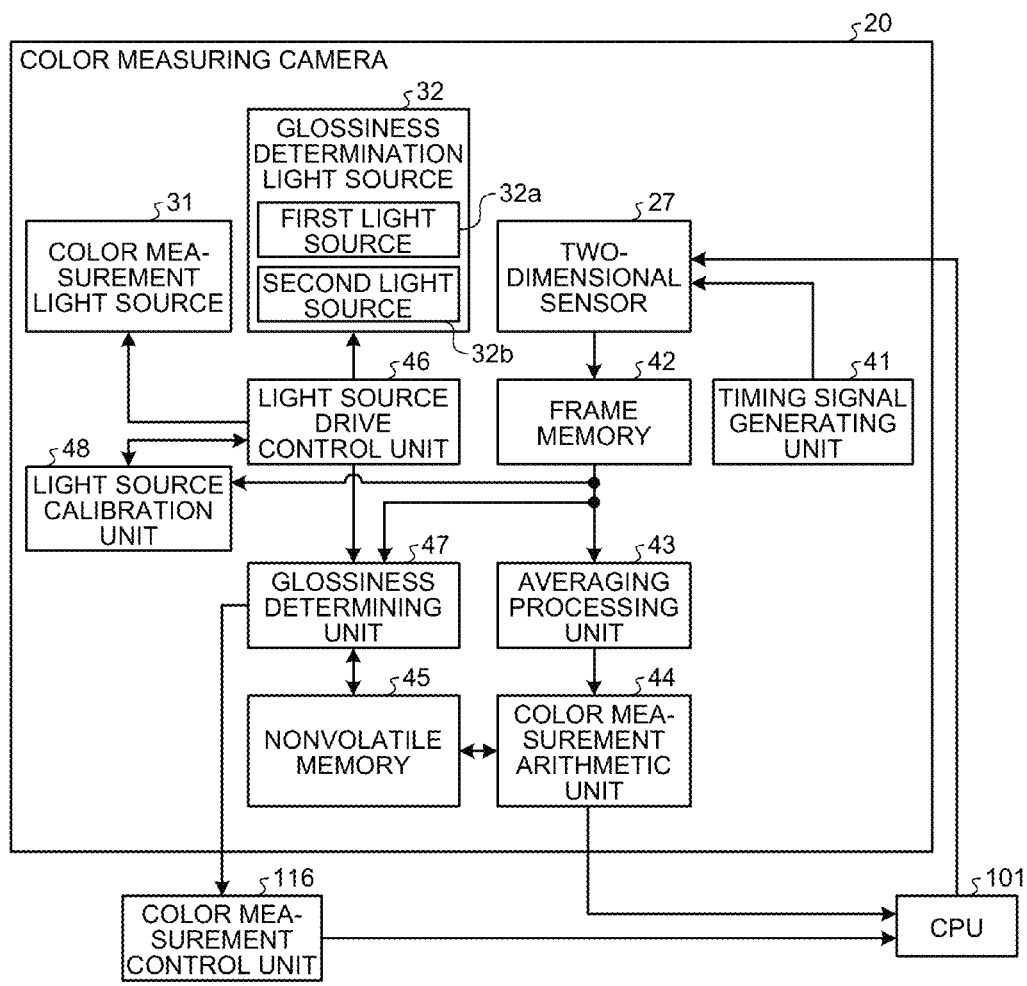
FIG. 23 is a block diagram illustrating another configuration example of the control mechanism of the color measuring camera.

FIG. 23 is a block diagram illustrating a configuration example of the control mechanism of the color measuring camera 20 used in the present modification. The color measuring camera 20 used in the present modification includes a light source calibration unit 48, in addition to the components illustrated in FIG. 7.

The light source calibration unit 48 adjusts the amount of light of at least one of the first light source 32a and the second light source 32b such that the amount of light of the first light source 32a and the amount of light of the second light source 32b are equalized. In the present modification, the glossiness of the sheet P is determined by comparing the saturated image of the sheet P illuminated by the first light source 32a and an image of the glossiness reference area 410 illuminated by the second light source 32b. Therefore, if the amount of light varies between the first light source 32a and the second light source 32b, it becomes difficult to accurately determine the glossiness of the sheet P. In view of this, in the present modification, in advance of the above described determination of the glossiness of the sheet P, the light source calibration unit 48 performs adjustment such that the amount of light of the first light source 32a and the amount of light of the second light source 32b are equalized (hereinafter, referred to as light source calibration).

When the light source calibration is to be performed, for example, a calibration sheet of the same sheet type (for example, plain paper) as the sheet P having glossiness to be determined is arranged on the reference chart 400 inside the housing 23 of the color measuring camera 20. This operation is performed by, for example, temporarily removing the above described holder member 30 from the housing 23, arranging the reference chart 400 with the superimposed calibration sheet at the position of the opening 29, and re-attaching the holder member 30. Further, the first light source 32a and the second light source 32b of the glossiness determination light sources 32 are turned on by control by the light source drive control unit 46, and the two-dimensional sensor 27 captures an image. At this time, the image output by the two-dimensional sensor 27 contains an area that has received diffused light of the first light source 32a and an area that has received diffused light of the second light source 32b. The light source calibration unit 48 refers to the image, which is output by the two-dimensional sensor 27 and stored in the frame memory 42, and gives an adjustment command to the light source drive control unit 46 such that image data of the area that has received the diffused light of the first light source 32a and image data of the area that has received the diffused light of the second light source 32b are approximately equalized, that is, the amount of the diffused light of the first light source 32a and the amount of the diffused light of the second light source 32b are approximately equalized. The light source drive control unit 46 changes a current value supplied to at least one of the first light source 32a and the second light source 32b according to the adjustment command from the light source calibration unit 48. Consequently, the amount of the first light source 32a and the amount of the second light source 32b are equalized.

Figure 24:
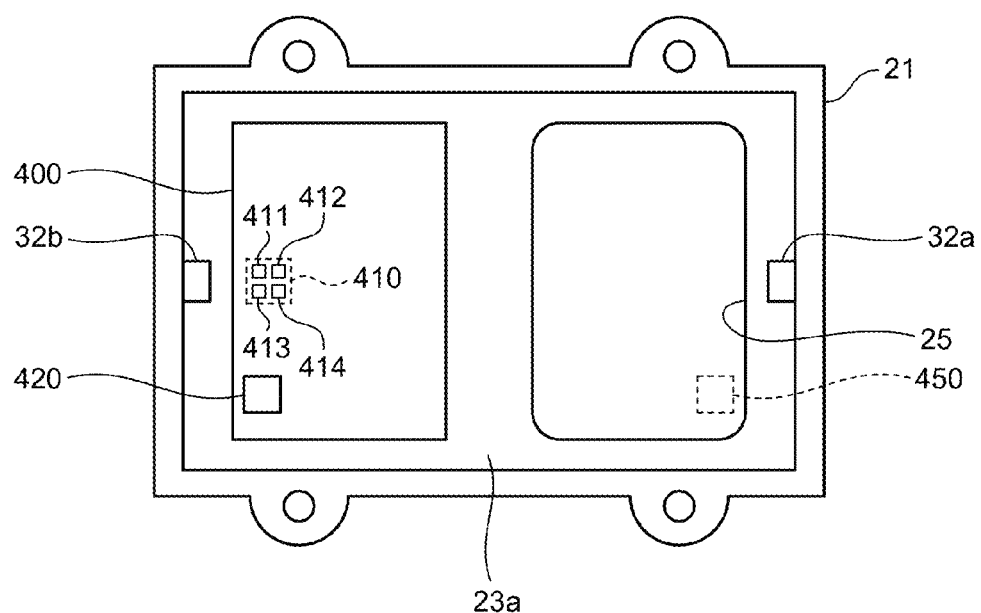
FIG. 24 is a view for explaining an example in which a light source calibration patch is provided on the reference chart.

Meanwhile, in the example described above, the light source calibration is performed by arranging, on the reference chart 400, the calibration sheet of the same sheet type as the sheet P having glossiness to be determined; however, as illustrated in FIG. 24, it may be possible to perform the light source calibration by using a light source calibration patch 420, which has a predetermined density and which is arranged on the reference chart 400 in advance. In this case, when the light source calibration is to be performed, a pattern 450 with the same density as the light source calibration patch 420 is formed on the sheet P having glossiness to be determined or on the platen 16. Then, the two-dimensional sensor 27 captures an image containing the pattern 450 illuminated with the diffused light of the first light source 32a and the light source calibration patch 420 illuminated with the diffused light of the second light source 32b. The light source calibration unit 48 refers to the image, which is output by the two-dimensional sensor 27 and stored in the frame memory 42, and gives an adjustment command to the light source drive control unit 46 such that image data of the area where the pattern 450 appears and image data of the area where the light source calibration patch 420 appears are approximately equalized, that is, the amount of the diffused light of the first light source 32a and the amount of the diffused light of the second light source 32b are approximately equalized. Consequently, similarly to the above described example, the amount of the first light source 32a and the amount of the second light source 32b are equalized.

In the present modification, the glossiness determining unit 47 determines the glossiness of the sheet P by using the image captured by the two-dimensional sensor 27 under illumination by the first light source 32a and the second light source 32b after the light source calibration has been performed. Specifically, the glossiness determining unit 47 extracts, from the image that is captured by the two-dimensional sensor 27 and stored in the frame memory 42, a saturated image of a blank area of the sheet P illuminated by the first light source 32a and an image of the glossiness reference area 410 provided on the reference chart 400. Then, the glossiness determining unit 47 determines the glossiness of the sheet P by comparing the saturated image of the blank area of the sheet P and the image of the glossiness reference area 410.

More specifically, for example, similarly to the above described first method, the two-dimensional sensor 27 repeats image capturing while uniformly increasing the amounts of light emitted from the first light source 32a and the second light source 32b. In this case, the image of the blank area of the sheet P contained in the image captured by the two-dimensional sensor 27 becomes a saturated image at a certain time point. The glossiness determining unit 47 checks the image of the glossiness reference area 410 at a time when the image of the blank area of the sheet P becomes the saturated image or during a predetermined period before and after this time, specifies, from among the glossiness patterns 411 to 414 contained in the glossiness reference area 410, a glossiness pattern in which pixel values are saturated at a time closest to the time at which the image of the blank area of the sheet P becomes the saturated image, and determines the glossiness of the glossiness pattern as the glossiness of the sheet P.

Further, similarly to the above described third method for example, the glossiness determining unit 47 may specify a glossiness pattern with a pixel value closest to the blank area of the sheet P from among the glossiness patterns 411 to 414 contained in the glossiness reference area 410 by using the image that is captured by the two-dimensional sensor 27 when the first light source 32a and the second light source 32b emit predetermined amounts of light, and determine the glossiness of the specified glossiness pattern as the glossiness of the sheet P.

Figure 25:
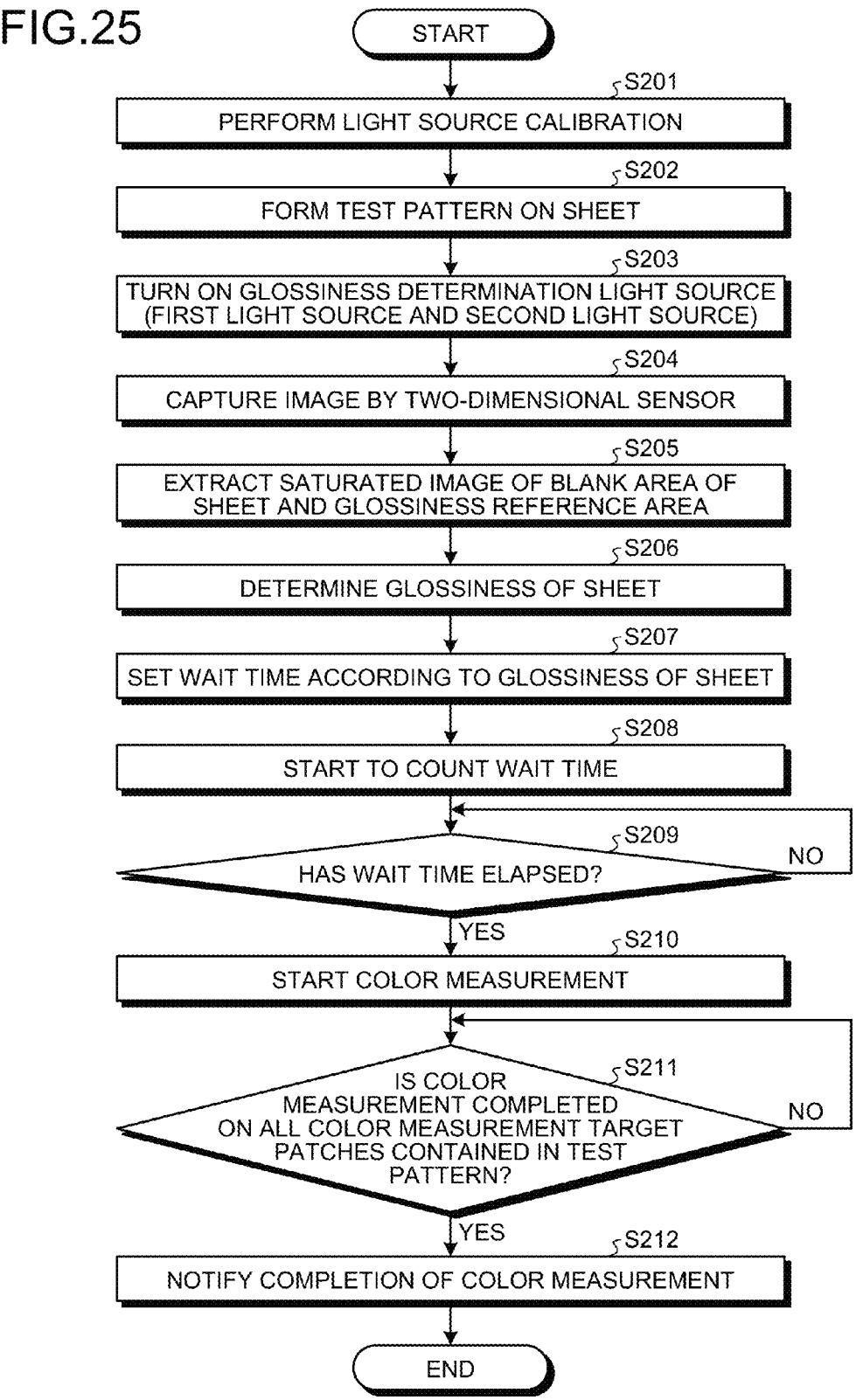
FIG. 25 is a flowchart illustrating another example of the flow of the process performed when the image forming apparatus performs color measurement on the color measurement target patches.

FIG. 25 is a flowchart illustrating another example of the flow of the process performed when the image forming apparatus 100 performs the color measurement on the color measurement target patches CP, and is a flowchart illustrating the flow of the process including determination of the glossiness performed by the image forming apparatus 100 according to the present modification.

In the present modification, in advance of the color measurement on the color measurement target patches CP, the light source calibration unit 48 of the color measuring camera 20 performs the above described light source calibration (Step S201), and the amount of the first light source 32a and the amount of the second light source 32b are adjusted so as to be equalized. After the light source calibration is finished, a test pattern is formed on the sheet P set on the platen 16 (Step S202).

Subsequently, the glossiness determination light source 32 (the first light source 32a and the second light source 32b) is turned on by control by the light source drive control unit 46 (Step S203), and the two-dimensional sensor 27 captures an image containing the blank area of the sheet P illuminated by the first light source 32a and the glossiness reference area 410 on the reference chart 400 illuminated by the second light source 32b (Step S204).

Then, the glossiness determining unit 47 extracts, from the captured image output from the two-dimensional sensor 27, the saturated image of the blank area of the sheet P and the image of the glossiness reference area 410 (Step S205), and determines the glossiness of the sheet P by comparing the saturated image of the blank area of the sheet P and the image of the glossiness reference area 410 (Step S206).

Subsequently, the color measurement control unit 116 of the image forming apparatus 100 sets a wait time to start the color measurement on the color measurement target patches CP according to the glossiness of the sheet P determined by the glossiness determining unit 47 (Step S207), and starts to count the wait time (Step S208). The color measurement control unit 116 waits until the wait time set at Step S207 has elapsed (Step S209: No), and when the wait time has elapsed (Step S209: Yes), the color measuring camera 20 is caused to start the color measurement on the color measurement target patches CP (Step S210). Incidentally, it may be possible to display a remaining time of the wait time on the operation panel 17 during the wait. Further, during the wait until the wait time has elapsed, it may be possible to temporarily stop supply of power to each of the units of the image forming apparatus 100 except for the unit that manages the wait time. Furthermore, if the glossiness determining unit 47 is disabled to determine the glossiness of the sheet P, for example, it may be possible to output an alert indicating the disablement and accept setting of a wait time from an operator using the operation panel 17.

Thereafter, the color measurement control unit 116 monitors the color measurement on the color measurement target patches CP performed by the color measuring camera 20, and continually determines whether the color measurement on all of the color measurement target patches contained in the test pattern is finished (Step S211). If the color measurement on all of the color measurement target patches CP contained in the test pattern is finished (Step S211: Yes), completion of the color measurement is notified to a user by, for example, display on the operation panel 17 (Step S212), and a series of the processes is finished.

Other Modifications

In the above-described embodiment, the color measuring camera 20 has the function to calculate the color measurement values of the color measurement target patches CP; however, it is possible to calculate the color measurement values of the color measurement target patches CP outside the color measuring camera 20. For example, it may be possible to cause the CPU 101 or the control FPGA 110 mounted on the main control board 120 of the image forming apparatus 100 to calculate the color measurement values of the color measurement target patches CP. In this case, the color measuring camera 20 is configured to send the RGB values (or captured image data) of the color measurement target patches CP and the reference chart 400 to the CPU 101 or the control FPGA 110, instead of the color measurement values of the color measurement target patches CP. That is, the color measuring camera 20 is configured as an image capturing unit that does not have the function to calculate the color measurement values.

Further, in the above-described embodiment, the color measuring camera 20 is configured to move on the sheet P on which the test pattern is formed, by using a mechanism of the image forming apparatus 100; however, the color measuring camera 20 may be separated from the image forming apparatus 100 and may be configured to move on the sheet P on which the test pattern is formed by using own moving mechanism. That is, while the above described embodiment is an example in which the image forming apparatus 100 has the function as the color measuring device, it may be possible to configure the color measuring device as a device independent of the image forming apparatus 100, and cause the color measuring device to calculate the color measurement values of the color measurement target patches CP contained in the test pattern formed by the image forming apparatus 100.

Figure 26:
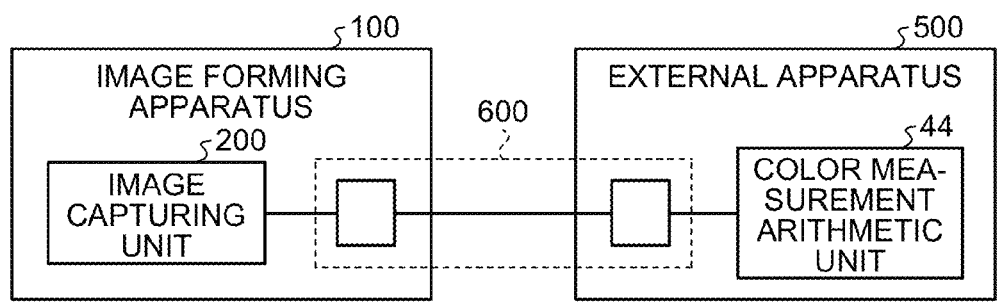
FIG. 26 is a view illustrating a schematic configuration of a color measuring system.

Furthermore, in the above-described embodiment, the image forming apparatus 100 including the color measuring camera 20 has the function to calculate the color measurement values of the color measurement target patches CP; however, the color measurement values of the color measurement target patches CP need not always be calculated inside the image forming apparatus 100. For example, as illustrated in FIG. 26, it may be possible to construct an image forming system, in which the image forming apparatus 100 and an external apparatus 500 are communicably connected, provide the external apparatus 500 with the function of the color measurement arithmetic unit 44 to calculate the color measurement values of the color measurement target patches CP, and cause the external apparatus 500 to calculate the color measurement values. That is, the image forming system includes an image capturing unit 200 (a structure obtained by removing the color measurement arithmetic unit 44 from the above described color measuring camera 20) provided in the image forming apparatus 100, the color measurement arithmetic unit 44 provided in the external apparatus 500, and a communication unit 600 that connect the image capturing unit 200 and the color measurement arithmetic unit 44 (the image forming apparatus 100 and the external apparatus 500). As the external apparatus 500, for example, a computer called a digital front end (DFE) may be used. Further, the communication unit 600 is able to use wired or wireless P2P communication, communication using a network, such as a LAN or the Internet, or the like.

In the above described configuration, for example, the image forming apparatus 100 transmits the RGB values of the color measurement target patches CP and the RGB values of the respective reference patches of the reference chart 400, which are obtained from captured images of the image capturing unit 200, to the external apparatus 500 by using the communication unit 600. The external apparatus 500 calculates the color measurement values of the color measurement target patches CP by using the RGB values of the color measurement target patches CP and the RGB values of the respective reference patches of the reference chart 400, which are received from the image forming apparatus 100, and generates or corrects a device profile in which the characteristics of the image forming apparatus 100 are written, based on the calculated color measurement values of the color measurement target patches CP. Then, the external apparatus 500 transmits the device profile to the image forming apparatus 100 by using the communication unit 600. The image forming apparatus 100 stores therein the device profile received from the external apparatus 500, and when performing image formation, corrects image data based on the device profile and forms images based on the corrected image data. Consequently, the image forming apparatus 100 can form images with high color reproducibility.

Furthermore, it may be possible to cause the external apparatus 500 to store therein the device profile of the image forming apparatus 100 generated based on the color measurement values of the color measurement target patches CP, and cause the external apparatus 500 to correct image data. Specifically, the image forming apparatus 100, when performing image formation, transmits image data to the external apparatus 500. The external apparatus 500 corrects the image data received from the image forming apparatus 100 based on the stored device profile of the image forming apparatus 100, and transmits the corrected image data to the image forming apparatus 100. The image forming apparatus 100 performs image formation based on the corrected image data received from the external apparatus 500. Consequently, the image forming apparatus 100 can form images with high color reproducibility.

Moreover, it may be possible to transmit the captured images obtained by the image capturing unit 200, rather than to transmit the RGB values of the color measurement target patches CP and the RGB values of the respective reference patches of the reference chart 400, from the image forming apparatus 100 to the external apparatus 500. In this case, the external apparatus 500 obtains the RGB values of the color measurement target patches CP and the RGB values of the respective reference patches of the reference chart 400 from the captured images received from the image forming apparatus 100, and calculates the color measurement values of the color measurement target patches CP by using the obtained RGB values.

Incidentally, the control functions of the respective units of the image forming apparatus 100 and the color measuring camera 20 (the image capturing unit 200) according to the above described present embodiment may be realized by hardware, software, or a complex configuration of hardware and software. If the control functions of the respective units of the image forming apparatus 100 and the color measuring camera 20 according to the present embodiment are realized by software, processors included in the image forming apparatus 100 and the color measuring camera 20 (the image capturing unit 200) execute programs in which processing sequences are written. The programs executed by the processors are provided by being incorporated in advance in, for example, ROMs or the like of the image forming apparatus 100 and the color measuring device. Further, the programs executed by the processors may be provided by being recorded in a computer-readable recording medium, such as a CD-ROM, a flexible disk (FD), a CD-R, or a digital versatile disk (DVD), in a computer-installable or computer-executable file format.

Furthermore, the programs executed by the processors may be stored in a computer connected to a network, such as the Internet, and may be provided by being downloaded via the network. Moreover, the programs executed by the processors may be provided or distributed via a network, such as the Internet.

According to an embodiment of the present invention, it is possible to obtain the glossiness of a subject having its image captured by a two-dimensional sensor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A glossiness determining device comprising:
   a light source;
   a two-dimensional sensor that receives reflected light containing a specular reflection component of a subject illuminated by the light source as an amount of light emitted from the light source onto the subject varies, and outputs an image of the subject; and
   a determining unit that determines glossiness of the subject by using a saturated image, which is the image of the subject output by the two-dimensional sensor and in which pixel values of a partial area are saturated.

2. The glossiness determining device according to claim 1, further comprising:
   a light source drive control unit that controls drive of the light source, and gradually increases the amount of light emitted from the light source from a reference light emission amount, with which the two-dimensional sensor does not output the saturated image as the image of the subject, to an amount, with which the two-dimensional sensor outputs the saturated image, wherein
   the determining unit determines the glossiness of the subject based on an increase in the amount of light emitted from the light source until the two-dimensional sensor outputs the saturated image.

3. The glossiness determining device according to claim 1, further comprising:
   a light source drive control unit that controls drive of the light source, and gradually increases the amount of light emitted from the light source from a reference light emission amount, with which the two-dimensional sensor does not output the saturated image as the image of the subject, to an amount with which the two-dimensional sensor outputs the saturated image, wherein
   the determining unit determines the glossiness of the subject based on a size of an area where pixel values are saturated in the saturated image when the two-dimensional sensor outputs the saturated image.

4. The glossiness determining device according to claim 1, wherein the determining unit determines whether the two-dimensional sensor outputs the saturated image when an amount of light emitted from the light source is a predetermined light emission amount, and when the image of the subject output by the two-dimensional sensor is not the saturated image, determines the glossiness of the subject based on magnitude of a pixel value of the image of the subject.

5. The glossiness determining device according to claim 1, further comprising a housing that integrally holds the light source and the two-dimensional sensor.

6. The glossiness determining device according to claim 1, wherein
   a glossiness reference area containing a plurality of glossiness patterns different in glossiness is provided inside the housing,
   the light source includes a first light source that illuminates the subject and a second light source that illuminates the glossiness reference area,
   the two-dimensional sensor receives reflected light containing a specular reflection component of the subject illuminated by the first light source and reflected light containing a specular reflection component of the glossiness reference area illuminated by the second light source, and outputs an image of the subject and the glossiness reference area, and
   the determining unit extracts the saturated image and a glossiness reference image being the image of the glossiness reference area, from the image of the subject and the glossiness reference area output by the two-dimensional sensor, and determines the glossiness of the subject by comparing the saturated image and the glossiness reference image.

7. The glossiness determining device according to claim 6, further comprising a light source calibration unit that adjusts an amount of light of at least one of the first light source and the second light source such that the amount of light of the first light source and the amount of light of the second light source are equalized.

8. A color measuring device comprising:
the glossiness determining device according to claim 1, wherein
the color measuring device acquires an image of a color measurement target as a subject by using the two-dimensional sensor, and performs color measurement on the color measurement target by using the image.

9. An image forming apparatus comprising:
the color measuring device according to claim 8; and
an image forming unit that forms a patch on a sheet, wherein
the color measuring device performs color measurement on, as the color measurement target, the patch formed on the sheet by the image forming unit.

10. The image forming apparatus according to claim 9, wherein
the determining unit determines glossiness of a blank area of the sheet, the blank area being an area in which the patch is not formed, and
the color measuring device starts color measurement on the patch after a lapse of a wait time determined according to the glossiness determined by the determining unit.

11. The image forming apparatus according to claim 10, further comprising a display unit that displays a remaining time of the wait time.

12. A glossiness determination method performed by a glossiness determining device that includes a light source, a two-dimensional sensor, and a determining unit, the glossiness determination method comprising:
receiving reflected light containing a specular reflection component of a subject illuminated by the light source as an amount of light emitted from the light source onto the subject varies, and outputting an image of the subject by the two-dimensional sensor; and
determining, by the determining unit, glossiness of the subject by using a saturated image, which is the image of the subject output by the two-dimensional sensor and in which pixel values of a partial area are saturated.

* * * * *